United States Patent [19]
Yoshida

[11] Patent Number: 5,218,711
[45] Date of Patent: Jun. 8, 1993

[54] MICROPROCESSOR HAVING PROGRAM COUNTER REGISTERS FOR ITS COPROCESSORS

[75] Inventor: Toyohiko Yoshida, Itami, Japan

[73] Assignee: Mitsubishi Denki Kabushiki Kaisha, Todyo, Japan

[21] Appl. No.: 524,243

[22] Filed: May 15, 1990

[30] Foreign Application Priority Data

May 15, 1989 [JP] Japan .................... 1-121925
May 19, 1989 [JP] Japan .................... 1-127148

[51] Int. Cl.⁵ .............. G06F 12/06; G06F 9/302; G06F 13/14; G06F 13/12
[52] U.S. Cl. .......................... 395/800; 364/228; 364/228.6; 364/229; 364/230.5; 364/239; 364/238.2; 364/231.8; 364/247.2; 364/247.4; 364/247.7; 364/247.8; 364/243; 364/DIG. 1
[58] Field of Search ............ 364/200, 900; 340/720; 395/800, 200, 375, 425, 250, 275, 325

[56] References Cited

U.S. PATENT DOCUMENTS

| | | | |
|---|---|---|---|
| 4,630,195 | 12/1986 | Hester et al. .................. | 395/375 |
| 4,715,013 | 12/1987 | MacGregor ................... | 395/375 |
| 4,750,110 | 6/1988 | Mothersole et al. ........... | 364/200 |
| 4,757,441 | 7/1988 | Buckland et al. .............. | 364/200 |
| 4,833,596 | 5/1989 | Buckland et al. .............. | 364/200 |
| 4,866,598 | 9/1989 | Sonnek et al. ................. | 364/200 |
| 4,871,164 | 10/1989 | Miner et al. ................... | 340/720 |
| 4,879,676 | 11/1989 | Hansen .......................... | 364/748 |
| 4,893,234 | 1/1990 | Davisson et al. .............. | 395/200 |
| 4,894,768 | 1/1990 | Iwasaki et al. ................. | 395/200 |
| 4,957,777 | 6/1990 | Flood et al. ................... | 364/900 |
| 5,029,073 | 7/1991 | Takaya et al. ................. | 364/200 |

OTHER PUBLICATIONS

"MC 68881/MC 68882 Floating-Point-Co-Processor User's Manual," Motorola, Inc., Prentice Hall, 1987, Section 7.

MC 68040 32-Bit Microprocessor User's Manual May 15, 1989.

*Primary Examiner*—Thomas C. Lee
*Assistant Examiner*—Daniel H. Pan
*Attorney, Agent, or Firm*—Townsend and Townsend Khourie and Crew

[57] ABSTRACT

In a data processing system, the program counter (PC) values of coprocessor (CP) instructions are stored in a queue of a CP, and the stored PC value is not erased until the CP has completed executing the instruction. The need for a queue is caused by the pipeline in the CP. Three instructions may be executing concurrently and an exception may occur for any one of them. Accordingly, at least 3 PC values may be stored in the queue. Early overwriting is prevented by making the queue 4 words deep. Also, the CP must assert a CPST signal before accepting a new command from the micro processor (MC). Thus, if the pipeline is full the PST signal will not be asserted and the MP must wait before storing the new PC value in the queue. Instead of the entire PC, only an entry point is transferred to the CP. When only four PC values are saved, the entry point is only two bits and may be transferred along with the command information in a single bus cycle. If there is more than one CP, a program status word (PSW) includes a CPID for identifying which CP is to execute a received CP instruction. The queue and the PCID system is only used for the first CP. In the event that an exception occurs, the entry point is transferred back to the MP and the PC of the instruction that took the exception is provided.

13 Claims, 32 Drawing Sheets

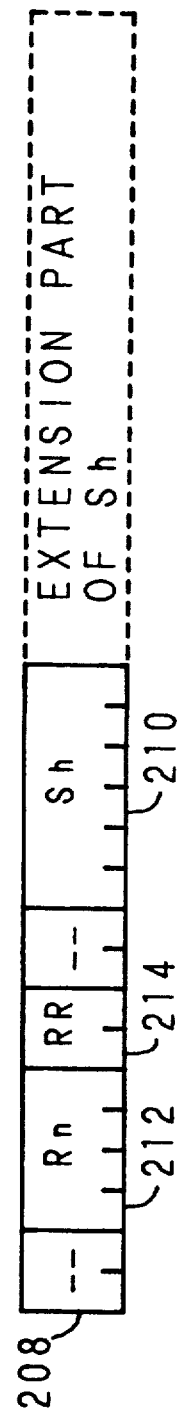
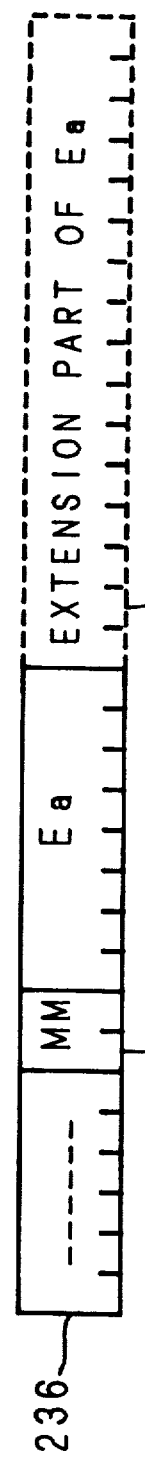
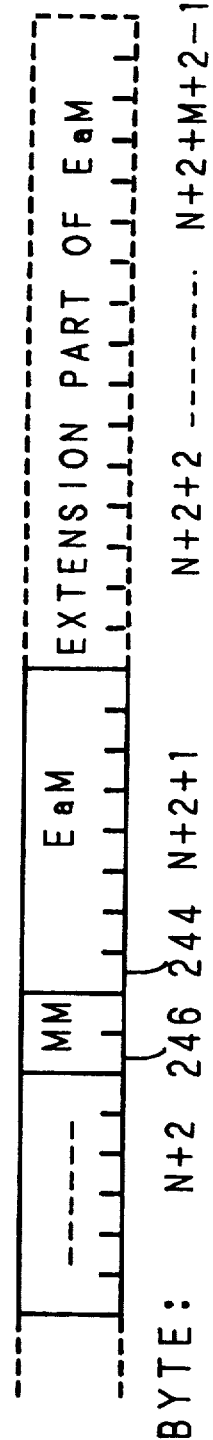

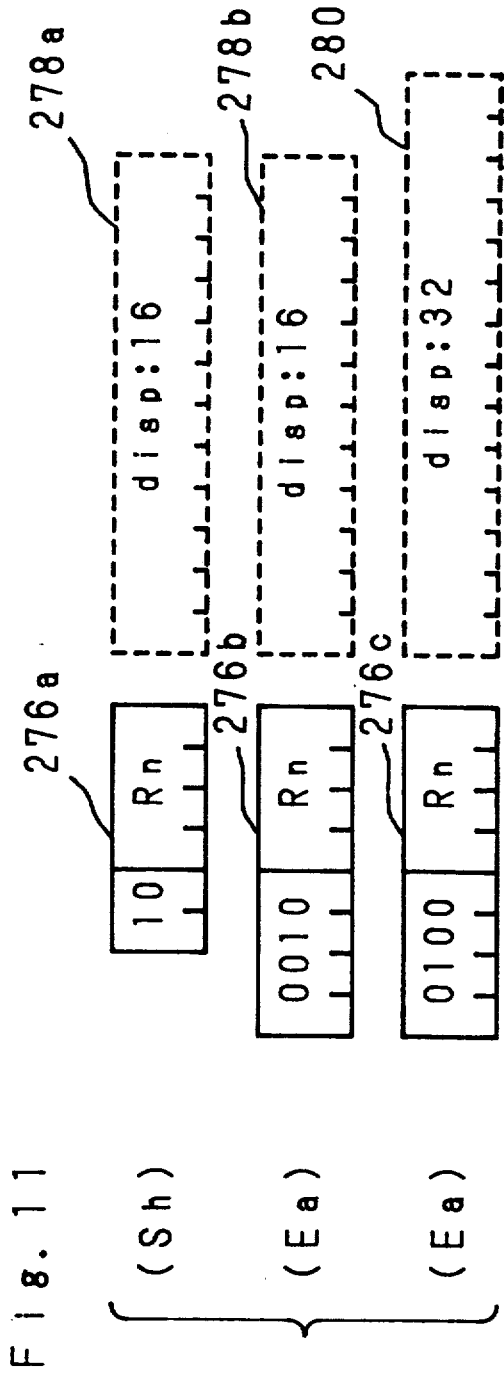
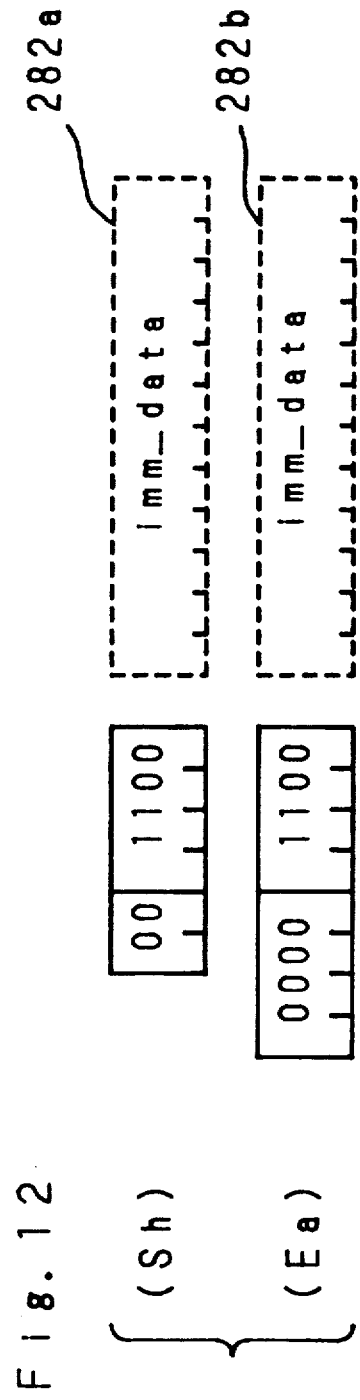

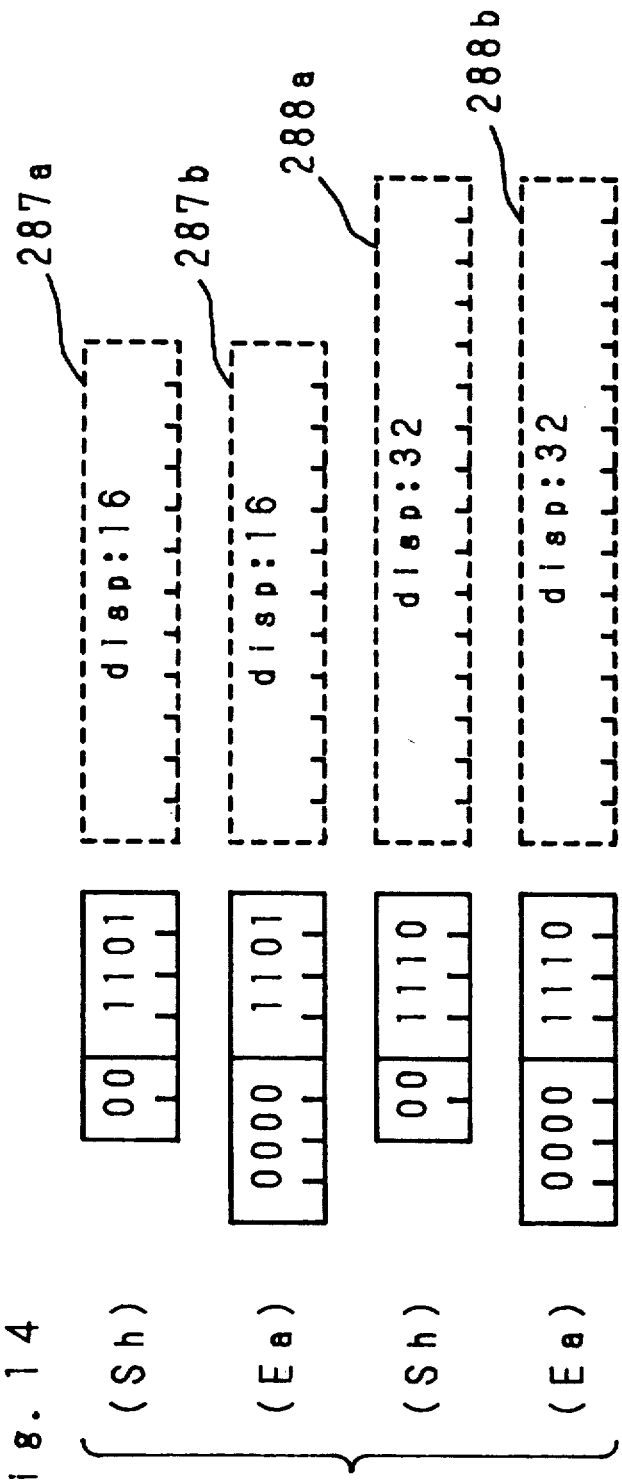
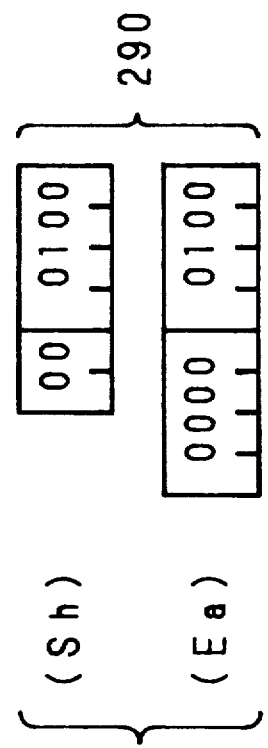

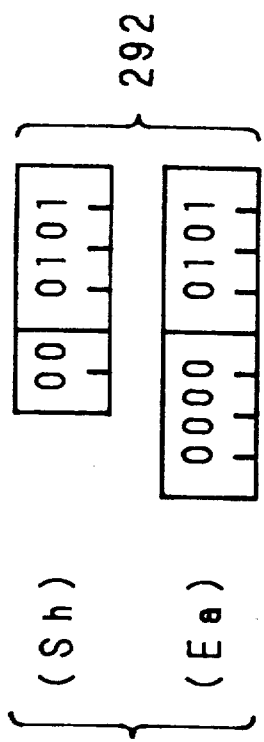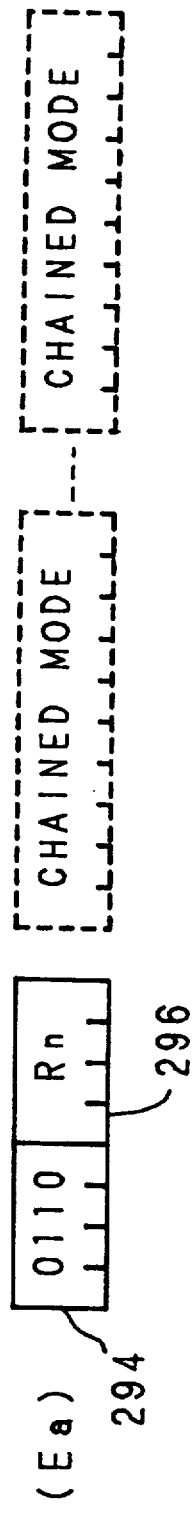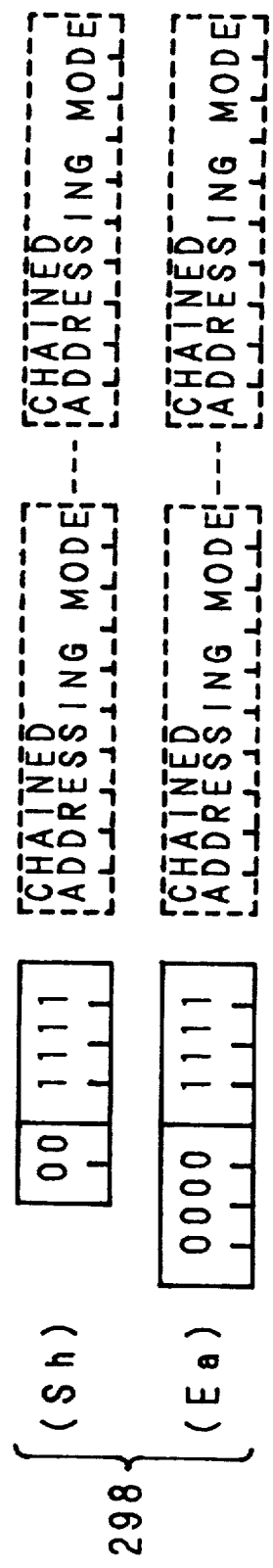

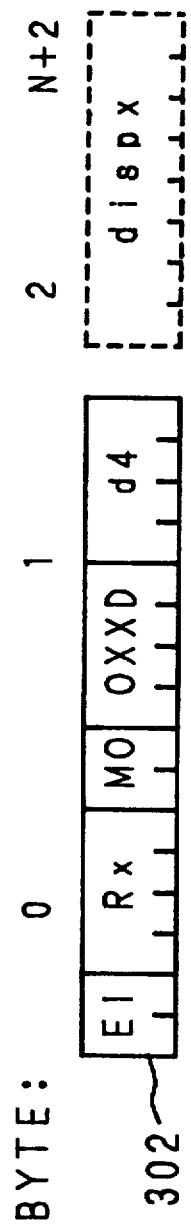
Fig. 19
Fig. 20

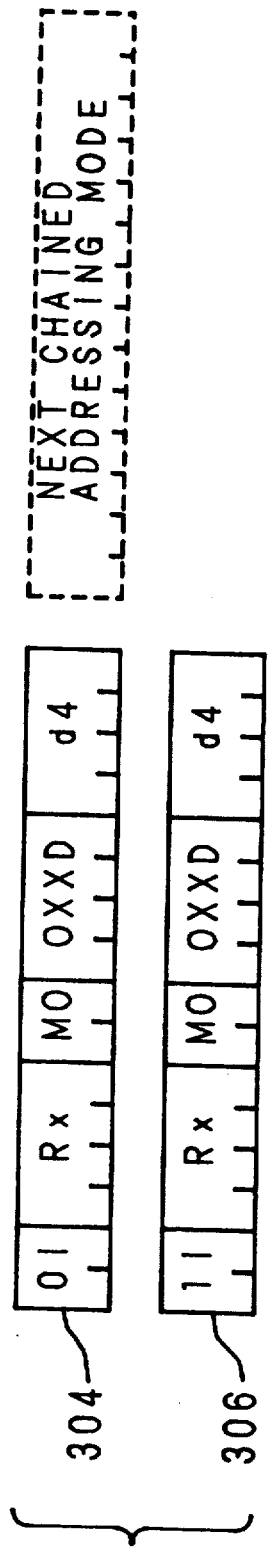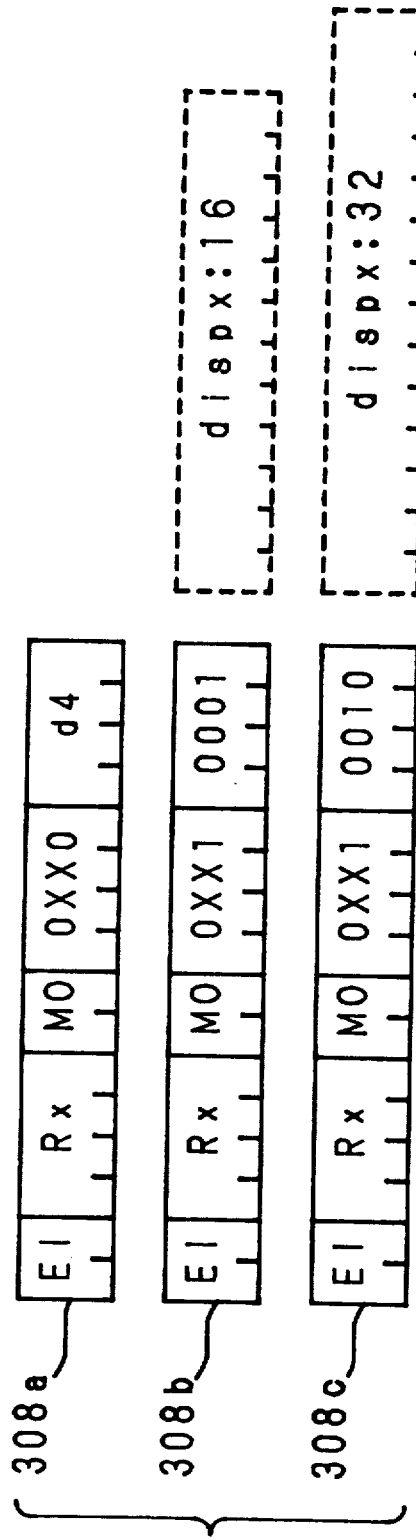

:M-FR INSTRUCTION,
GR-FR INSTRUCTION,
AND ONE OPERAND INSTRUCTION

:FR-FR INSTRUCTION

:ZERO OPERAND INSTRUCTION

Fig. 35

| BAT | ADDRESS BUS | DATA BUS H | DATA BUS L | INSTRUCTION BUS |
|---|---|---|---|---|
| 00 | DATA ADDRESS | MEMORY DATA H | MEMORY DATA L | RESERVED |
| 01 | INSTRUCTION ADDRESS | RESERVED | RESERVED | INSTRUCTION CODE |
| 10 | COMMAND | OPERAND H | OPERAND L | RESERVED |
| 11 | COMMAND | RESERVED | PC VALUE | RESERVED |

Fig. 36

| CPST | CONTENT |
|---|---|
| 000 | RESERVED |
| 001 | BUSY |
| 010 | COMMAND IS ACCEPTED |
| 011 | PREPARATION OF TRANSFER IS FINISHED |
| 100 | RESERVED |
| 101 | RE-TRANSFER IS REQUIRED |
| 110 | ERROR |
| 111 | NON-CONNECTIVE |

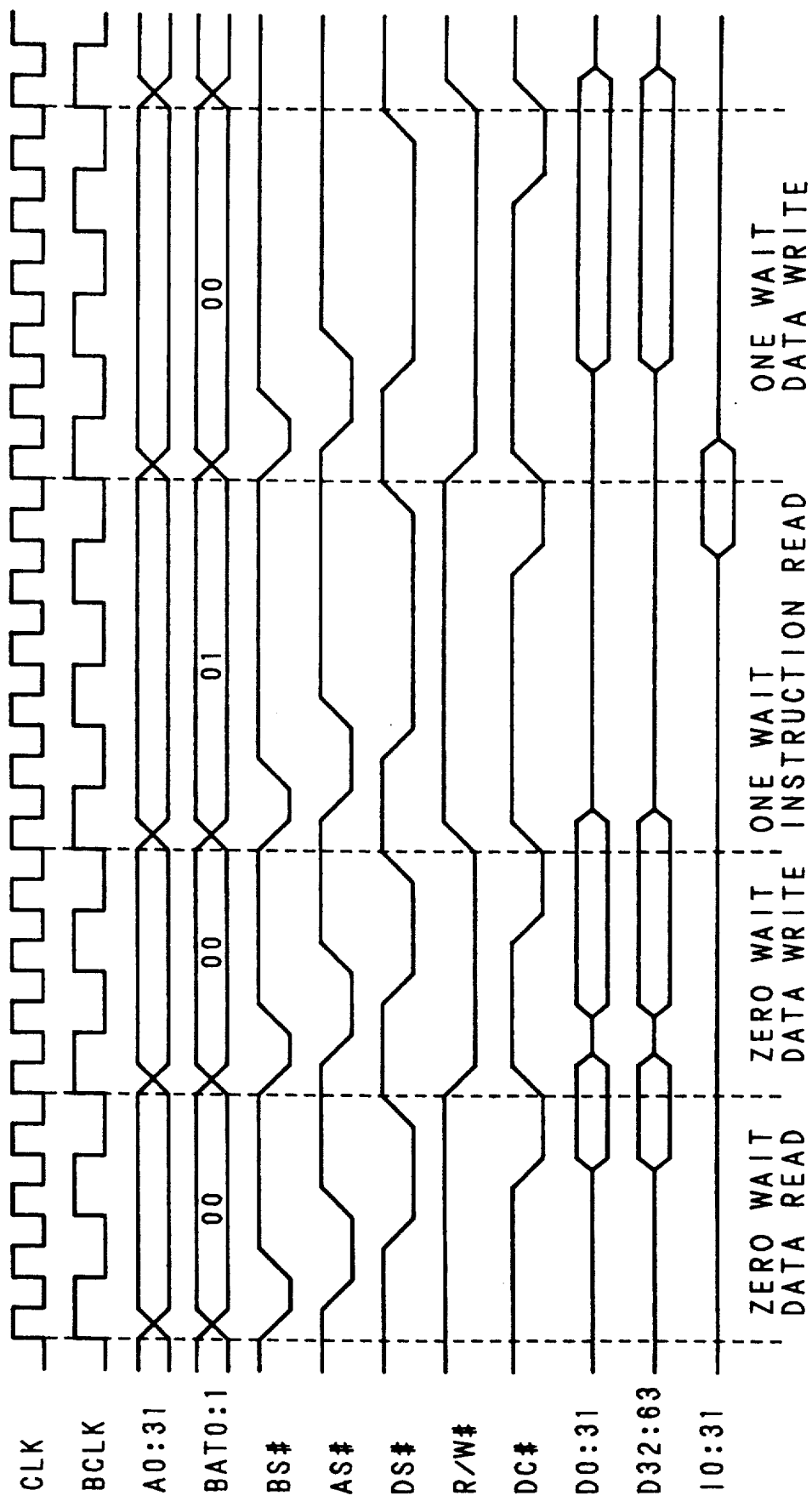

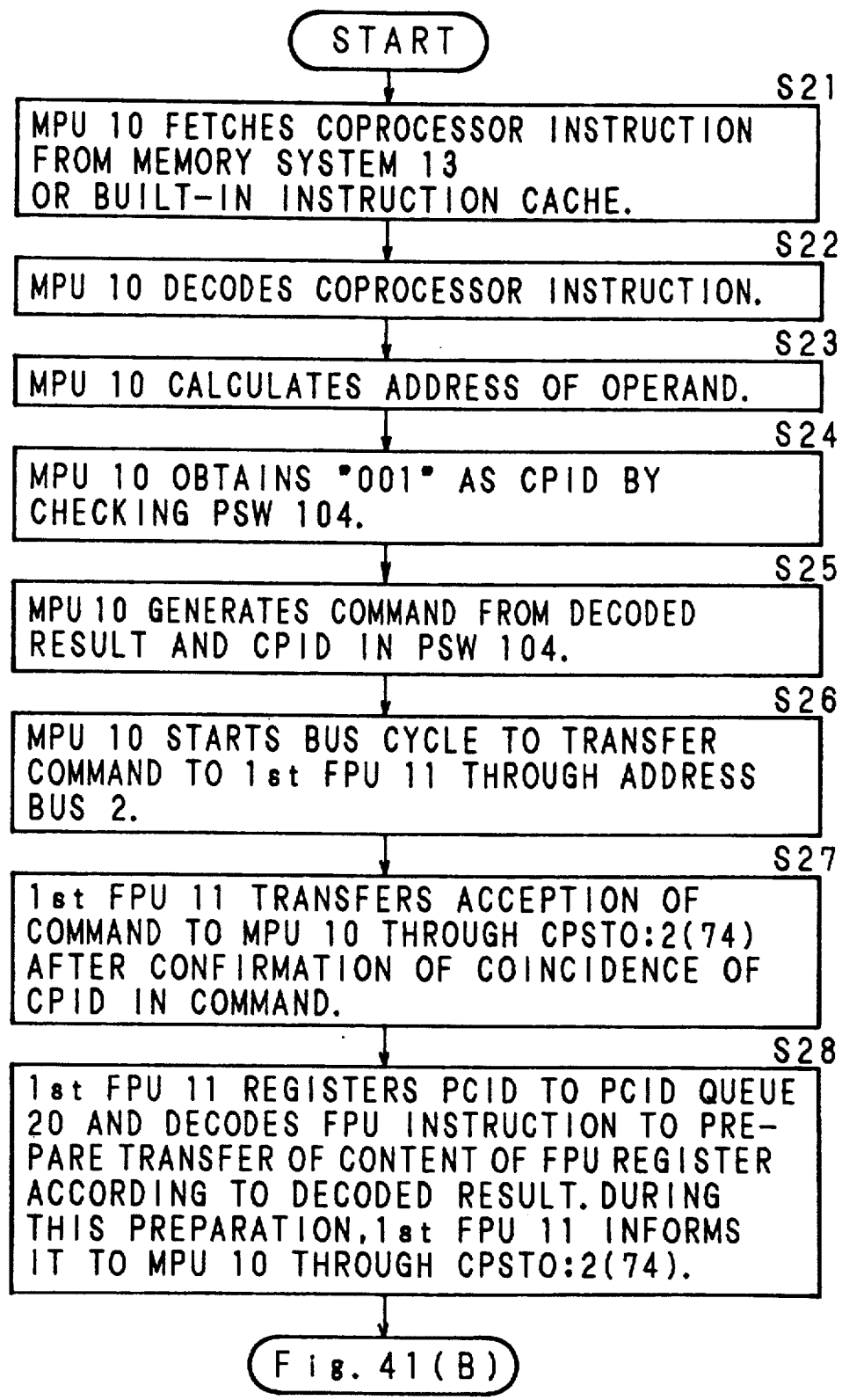

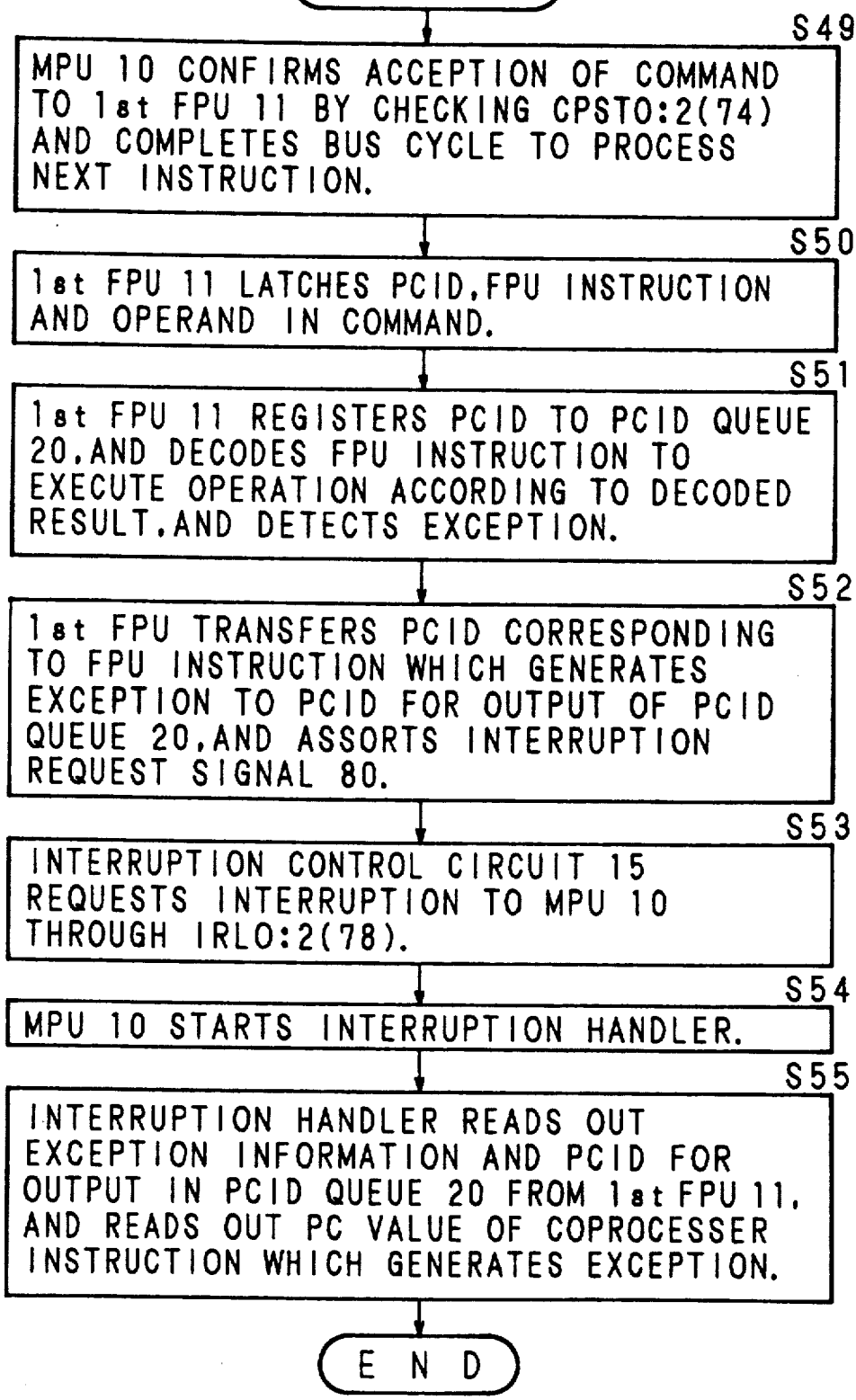

MICROPROCESSOR HAVING PROGRAM COUNTER REGISTERS FOR ITS COPROCESSORS

BACKGROUND OF THE INVENTION

1. Field of the Invention

The present invention relates to a microprocessor, a coprocessor and a data processing system using them, which has a high-speed coprocessor interface, transfers a command to a coprocessor on a small number of us cycles, and can execute a coprocessor instruction at a high speed, and further relates to a microprocessor, a coprocessor and a data processing system using them, which, when an exception has occurred in executing a main processor instruction, can identity a program counter (PC) value of the coprocessor instruction having caused the exception.

2. Description of Related Art

In the data processing system using the conventional microprocessor as a main processing unit (hereinafter referred to as MPU), a configuration is generally adopted that the MPU performs integer operation and a special-purpose coprocessor performs floating-point operation, for example, "Separate-Volume Interface, Numerical Operation Processor, CQ Publication, 1987" describes a data processing system using a microprocessor as a main processor and various floating-point processors as coprocessors.

In such a conventional data processing system, various devices are applied so that the main processor and the coprocessors take share in executing an instruction. FIG. 1 shows a configuration example of a data processing system using the conventional microprocessor and coprocessor.

An MPU 201 controlling the whole of the data processing system, an FPU (Floating-Point Processing Unit) 202 being a coprocessor, a memory system 203 storing instructions and data and a clock generator 204 supplying a clock CLK to the whole of the data processing system are connected by control signal lines 211, 212, 213, 214, 215, 216 and the like. In addition, a signal line 210 transfers the clock CLK, the signal line 211 transfers signals BS#, AS#, DS# and R/W#, the signal line 212 transfers a signal CPST0:2, the signal line 213 transfers a signal CPDC# and the signal line 214 transfers a signal DC# respectively, and the signal line 215 is used as an address bus A0:31 and the signal line 216 is used as a data bus D0:31, respectively.

FIG. 2 is a timing chart when a command, an operand and a PC value of a coprocessor instruction are transferred from the MPU 201 to the FPU 202 in executing the coprocessor instruction in the above-described data processing system as shown in FIG. 1.

In this conventional data processing system, the MPU 201 fetches and decodes a coprocessor instruction, and according to the decoded result, all of the command, the operand, and the PC value of the coprocessor instruction are transferred through the data bus 216.

In the example as shown in the timing chart of FIG. 2, a total of four memory cycles, one memory cycle for command transfer, two memory cycles, one memory cycle at each of high order and low order of data) for operand transfer and one memory cycle for PC value transfer, are needed. An approach for transferring such a command, operand and PC value of the coprocessor instruction with described in detail in "MC 68881/MC 68882 Floating-Point Co-Processor User's Manual", MOTOROLA, INC., PRENTICE HALL, 1987, section 7", or "Separate-Volume Interface, Numerical Operation Processor, CQ Publication, 1987, pp. 194–210".

Also, a data processing system has been proposed so for which adopts an approach that a coprocessor directly fetches a coprocessor instruction, decodes and executes it in place of the method wherein the MPU fetches and decodes a coprocessor instruction and transfers a command to the coprocessor.

For example, in the data processing system using the microprocessor i8086 made by Intel Co. as the MPU, the i8087 being the coprocessor monitors the bus always, and when a coprocessor instruction is outputted to the bus, the coprocessor fetches, decodes and executes this instruction. An approach is described in detail, for example, in "Separate-Volume Interface, Numerical Operation Processor, CQ Publication, 1987, pp. 60–74".

In the data processing system using the conventional microprocessor as the MPU, and using the coprocessor, as shown in the timing chart of FIG. 2, when the MPU directs the coprocessor to make an operation for a coprocessor instruction, it transfers the PC value of the coprocessor instruction together, and therefore a large number of memory cycles are required for directing the operation, and thereby the whole performance is deteriorated. The PC value of the coprocessor instruction is not required directly for executing the coprocessor instruction, but it is transferred to make provision against the case where an exception is generated in executing the coprocessor instruction, and is scarcely utilized, being wasteful.

Also, in the data processing system using the conventional microprocessor as the MPU wherein the coprocessor directly fetches and decodes the coprocessor instruction, an instruction prefetch queue and an instruction decoder like the MPU are required to be provided in the coprocessor, and thereby the quantity of hardware of the coprocessor is increased. Also, in the case where the same coprocessors are connected in a plural number and are operated in parallel, arbitration among the coprocessors becomes necessary for controlling that which coprocessor is to execute which coprocessor instruction. The problems of the data processing system adopting such an approach are described in detail in "Yoshiyuki FURUSAWA, Coming of Large-Scaled Propagation Period of Floating-Point Operation Coprocessor Triggered by the Opening of the Age of 32 Bits, Nikkei Electronics, No. 425, Jul. 13, 1987, pp. 123–138".

SUMMARY OF THE INVENTION

The basic idea is that when an exception occurs in the coprocessor (CP) there has to be a way to identify the program counter (PC) value of the instruction that took the exception. Generally, the coprocessor may be doing a long calculation and the PC in the main processor (MP) will have changed values. Thus, when the exception occurs the PC value of the instruction which took the exception is lost.

This problem is solved in the prior art by transferring the PC value of the instruction being executed to the coprocessor. Since the coprocessor is wide, e.g., 32 bits, a bus cycle is required to transfer the PC value to the coprocessor. However, since the probability of an exception is small this transferred information is rarely used.

In the preferred embodiment, the PC values of coprocessor instructions are stored in a queue. It is important not to erase the stored PC value until the coprocessor has completed executing the instruction. The need for a queue is caused by the pipeline in the coprocessor. Three instructions may be executing concurrently and an exception may occur for any one of them. Accordingly, at least 3 PC values must be stored in the queue. Early overwriting is prevented by making the queue 4 words deep. Also, the coprocessor must assert a CPST signal before accepting a new command from the main processor. Thus, if the pipeline is full the CPST signal will not be asserted and the main processor must wait before storing the new PC value in the queue.

Instead of the entire PC, only an entry point is transferred to the coprocessor. When only four PC values are saved, the entry point is only two bits and may be transferred along with the command information in a single bus cycle.

If there are more than one coprocessor, a program status word (PSW) includes a CPID (coprocessor identifier) for identifying which coprocessor is to execute a received coprocessor instruction. The queue and PCID system is only used for the first coprocessor.

Another important feature is the use of only a single decoder. In the two chip embodiment, the decoder is included in the main processor and a decoded coprocessing command is transferred from the main processor to the coprocessor via the address bus. In the single chip embodiment, the decoder is connected to both the main and coprocessing elements.

In the event that an exception occurs, the entry point is transferred back to the main processor and the PC of the instruction that took the exception is provided.

The above and further objects and features of the invention will more fully be apparent from the following detailed description with accompanying drawings.

BRIEF DESCRIPTION OF THE DRAWINGS

FIG. 5 through FIG. 8 are schematic diagrams showing formats of the instructions of the microprocessor and the coprocessors of the present invention, FIG. 9 through FIG. 22 are schematic diagrams for explaining addressing modes of the instruction of the microprocessor of the present invention, FIG. 35 is a table showing values of a signal BAT0:1 showing kinds of memory cycle of the microprocessor of the present invention and contents of a data bus, an address bus and an instruction bus for each value, FIG. 36 is a table showing values of a signal CPST0:2 delivering an internal state of the coprocessor to the microprocessor of the present invention and meanings thereof, FIG. 37 is a timing chart when the microprocessor of the present invention accesses a memory.

DESCRIPTION OF THE PREFERRED EMBODIMENTS

Hereinafter, detailed description is made on the present invention based on drawings showing embodiments thereof.

(1) "Microprocessor, Coprocessors and a Data Processing System Using Them of the Present Invention"

Figure 1:
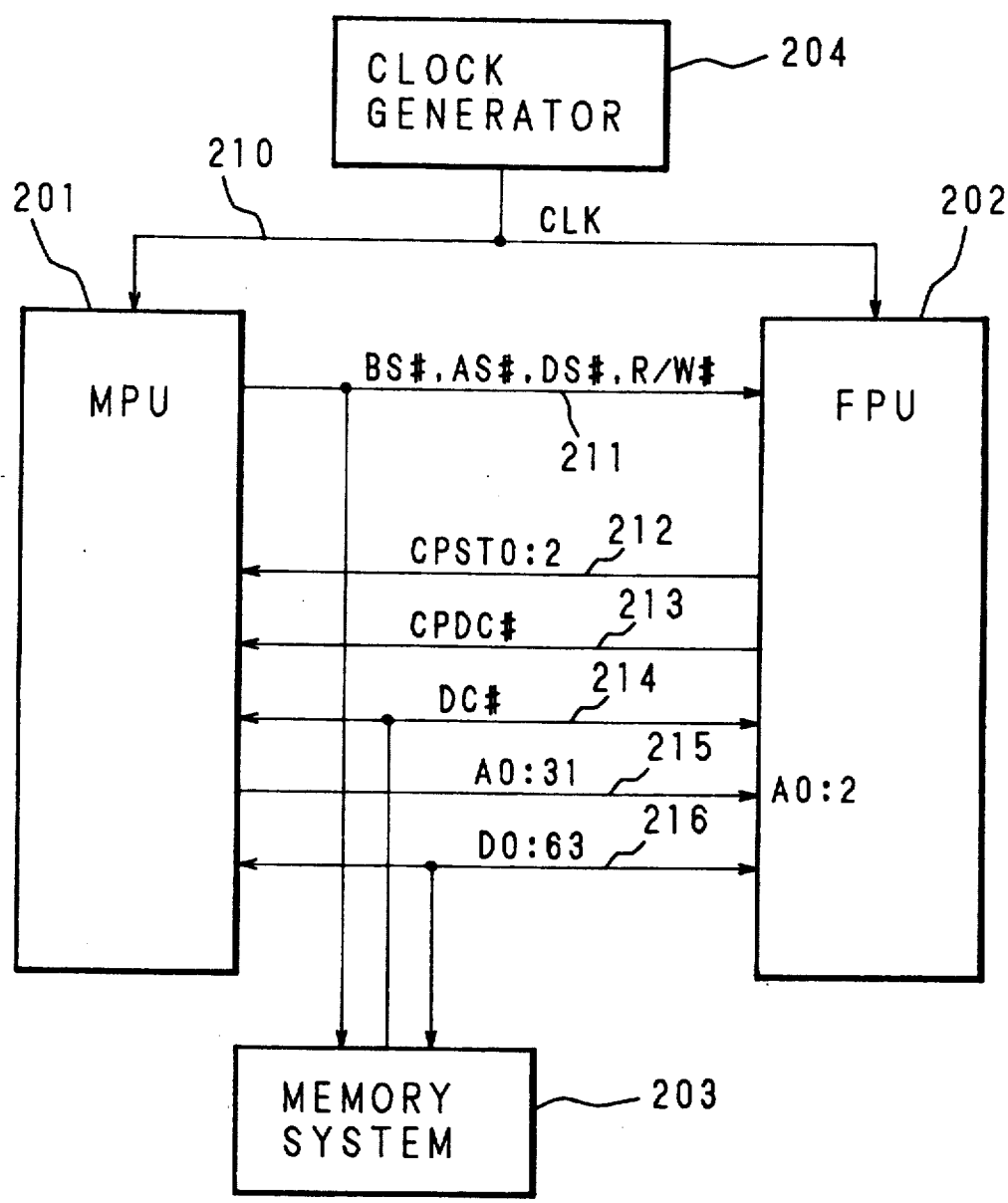
FIG. 1 is a block diagram showing a configuration of a data processing system using a conventional microprocessor and coprocessor.
Figure 2:
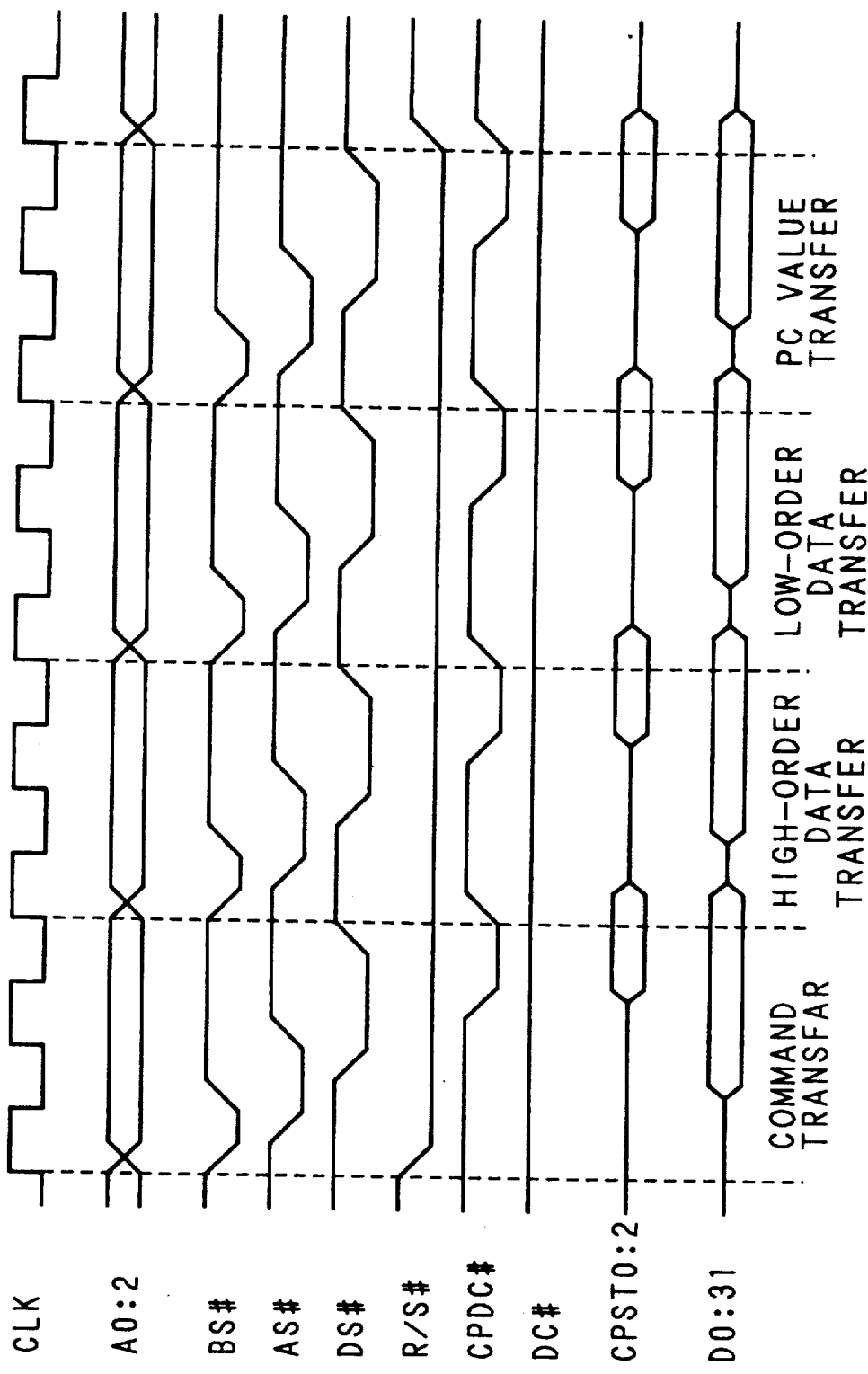
FIG. 2 is a timing chart when an MPU accesses the coprocessor in the data processing system using the conventional microprocessor.
Figure 3:
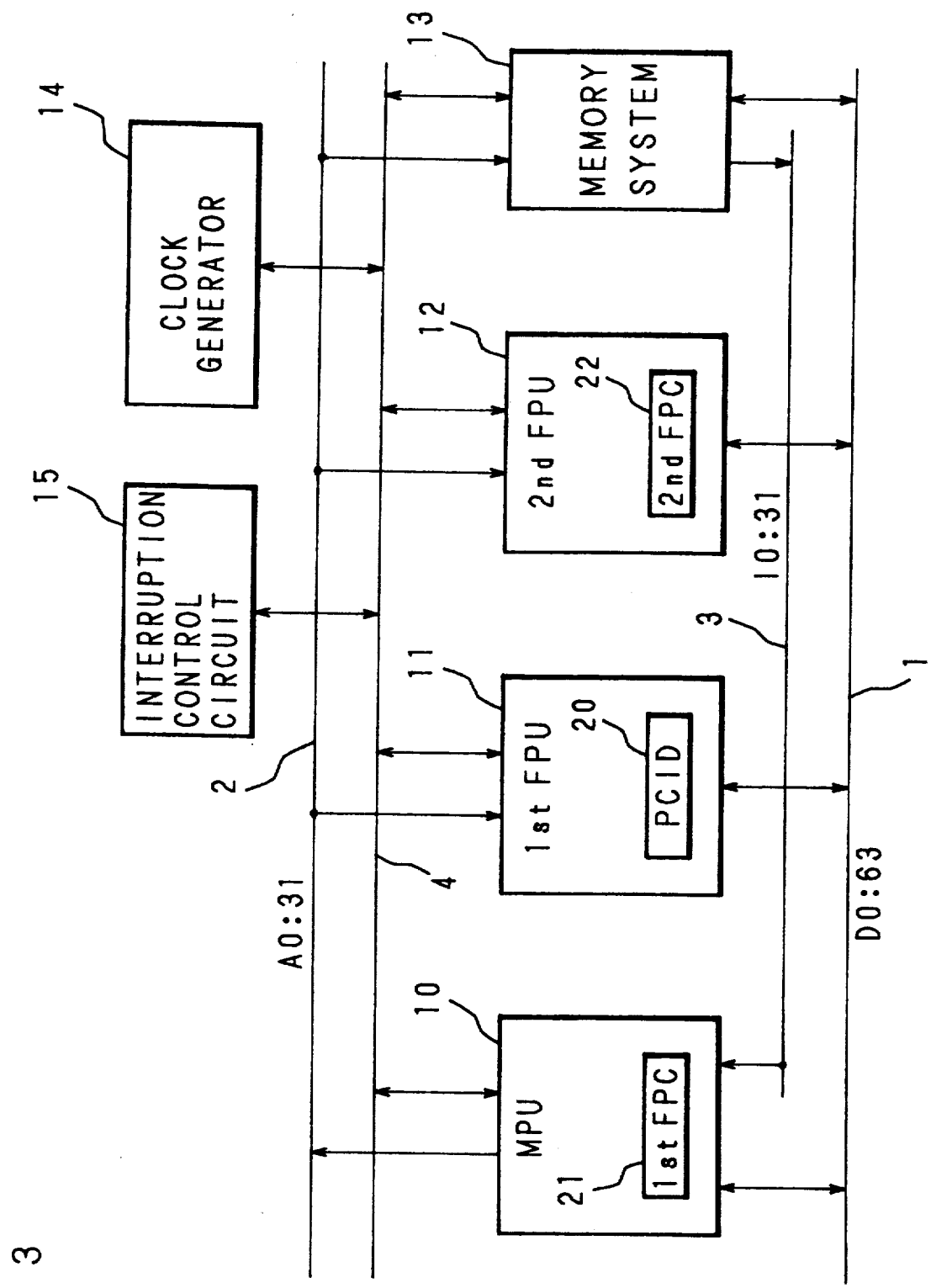
FIG. 3 is a block diagram showing a configuration example of a data processing system using a microprocessor and coprocessors of the present invention.

FIG. 3 is a block diagram showing a configuration example of a microprocessor, coprocessors and a data processing system using them of the present invention.

This system is constituted with a main processor (MPU) 10 controlling the whole of the unit, two coprocessors 11 (a first FPU) and 12 (a second FPU) executing floating-point operation, a memory system 13 storing instructions and data, an interrupt control circuit 15 controlling an interrupt to the MPU 10, a clock generator 14 supplying a clock determining timings of the whole of the system and the like.

The MPU 10, the first FPU 11, the second FPU 12 and the memory system 13 are connected by a data bus D0:63 (a signal line 1) of 64 bits and an address bus A0:31 (a signal line 2) of 32 bits. The MPU 10 and the memory system 13 are connected also by an instruction bus I0:31 (a signal line 3) of 32 bits. Also, the whole of the unit is connected by a control signal line 4.

The MPU 10 is operated as a bus master of the whole system, and a signal is outputted all the time from the MPU 10 to the address bus A0:31(2). The MPU 10 outputs addresses to the memory system 13 through the address bus A0:31(2), and fetches instructions from the memory system 13 through the instruction bus I0:31(3), and executes them. When the MPU 10 executes instructions, it inputs/outputs operands from/to the memory system 13 through the data bus D0:63(1) as required. Also, when a coprocessor instruction is decoded, a command is sent from the MPU 10 to the first FPU 11 or the second FPU 12 through the address bus A0:31(2), and an operation is performed by the FPU 11 or 12.

When an operation is performed by the FPU 11 or 12, the MPU 10 inputs/outputs operands through the data bus D0:63(1) as required. Whether the coprocessor instruction is to be executed by the first FPU 11 or by the second FPU 12 is determined by a coprocessor identifier (CPID) held in the MPU 10 at that time. The CPID can be re-written by software, and by re-writing the CPID, the MPU 10 can execute the co-processor instruction by either of the first FPU 11 or the second FPU 12. Also, registers holding PC (program counter) values of coprocessor instructions are provided in the MPU 10 and the FPU 12 to identify the PC value of the coprocessor instruction having generated an exception when the exception has occurred in executing an operation in the FPU 11 or 12.

A PC quene (a first FPC 21) holding a plurality of PC values of the coprocessor instructions to be executed by the first FPU 11 is provided in the MPU 10, and a second FPC 22 holding PC values of the coprocessor instructions to be executed by the second FPU 12 is provided in the second FPU 12. A PCID queue 20 registering the entry number PCID of the first FPC 21 of the MPU 10 is provided in the first FPU 11. PCID and PC values to be held in the second FPC 22 are transferred from the MPU 10. These first and second FPCs 21 and 22 are the registers as described above.

PC values held in the first FPC 21 or the second FPC 22 are used when the corresponding coprocessor instruction has caused an exception. When a coprocessor instruction has caused an exception in the FPU 11 (12), first, an interrupt is requested to the interrupt control circuit 15 from the FPU 11 (12). The interrupt control circuit 15 requests the MPU 10 to perform interrupt processing according to an interrupt request from the FPU 11 (12). Thereby, an interrupt processing handler is started. In the interrupt processing handler, exception information is read from the FPU 11 (12), and according to the content thereof, the PCID 20 and the first FPC 21, or the second FPC 22 are accessed, and the PC value of the main processor instruction are read, and exception processing is performed.

Hereinafter, detailed description is made further on an instruction system, a processing mechanism and a processing method of the microprocessor and the coprocessors of the present invention.

(2) "Instruction Format of Microprocessor and Coprocessor of the Present Invention"

An instruction of a microprocessor and a coprocessor of the present invention is formed on a 16-bit unit basis, being variable in length. No instruction with an odd number of bytes is used herein.

The microprocessor of the present invention has an instruction format system specifically devised for the purpose of writing highly frequent instructions in a short format. For example, as to a two-operand instruction, two formats are provided; a general-type format which has basically a configuration of "four bytes+extension part(s)" and allows the utilization of all addressing modes and a reduced-type format allowing only the use of a highly frequent instruction and an addressing mode.

The meanings of symbols appearing in the instruction format of the microprocessor and the coprocessor of the present invention shown in FIG. 4 to FIG. 8 are as follows:

—: Portion wherein operation code is put.
Ea: Portion for generating an operand in a general-type 8-bit addressing mode.
Sh: Portion for designating an operand in a reduced-type 6-bit addressing mode.
Rn: Portion for designating an operand in a register by the register number.

Figure 4:
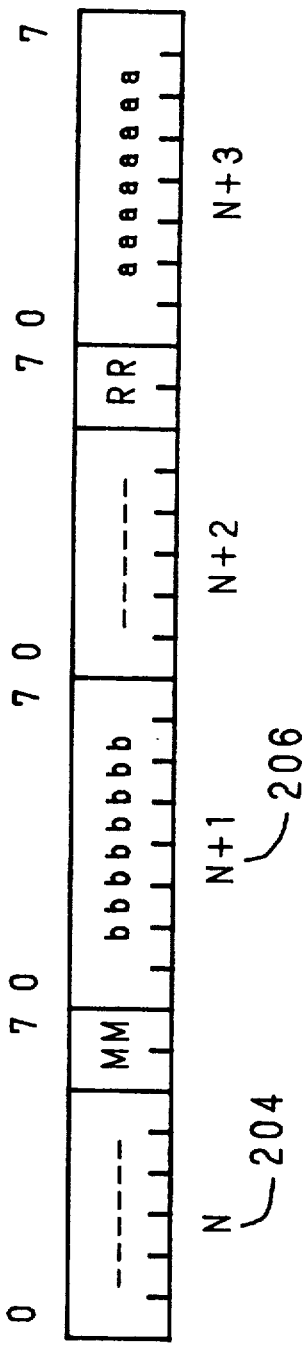
FIG. 4 is a schematic diagram showing an arrangement of an instruction in a memory of the microprocessor of the present invention.

In the format, as shown in FIG. 4, the right side 202 is the LSB side and is high address. The instruction format can be discriminated only after an address N 204 and an address N+1 206 are checked. As described above, this is because of a premise that the instruction is fetched and decoded on a 16-bit (2-byte) unit basis without fail.

In the microprocessor and coprocessor of the present invention, in the case with any format, the extension part of Ea or Sh of each operand is sure to be positioned immediately after a half word comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next instruction. For example, consideration is made on the case of 6-byte instruction which comprises Ea1 in a first half word, Ea2 in a second half word, and ends with a third half word. Since the chained addressing mode is used for Ea1, another extension part of the chained addressing mode is assumed to be attached in addition to the ordinary extension part, and then the actual instruction bit pattern is composed in the sequence of the first word of instruction (including the basic part of Ea1), the expansion part of Ea1, the chained addressing mode extension part, the second half word of instruction (including the basic part of Ea2), the expansion part of Ea1 and the third half word of instruction.

(2.1) "Reduced-Type Two-Operand Instruction"

FIG. 5 is a schematic diagram showing a format 208 of an operational instruction between memory and register. This format includes a L-format wherein the source operand side is a memory and a S-format wherein the destination operand side is a memory.

In the L-format, symbol Sh 210 represents the designating field of the source operand, symbol Rn 212 represents the designating field of the register of the destination operand and RR 214 represents designating of the operand size of Sh 210, respectively. The size of the destination operand located in the register is fixed to 32 bits. Where the size of the resister side differs from that of the memory side and the size of the source side is smaller, sign extension is performed.

In the S-format, symbol Sh 210 represents the designating field of the destination operand, symbol Rn 212 represents the register designating field of the source operand and RR 214 represents designating of the operand size of Sh 210, respectively. The size of the source operand located in the register is fixed to 32 bits. Where the size of the register side differs from that of the memory side and the size of the source side is larger, truncating of the overflow portion and overflow check are performed.

(2.2) "General-Type One-Operand Instruction"

FIG. 6 is a schematic diagram showing a general-type format 236 of one-operand instruction (G1-format). Symbol MM 238 represents the designating field of the operand size. Some of the G1-format instructions comprise an extension part besides the extension part of Ea 240. There are also instructions using no MM 238.

(2.3) "General-Type Two-Operand Instruction"

FIG. 7 is schematic diagram showing general-type formats of two-operand instruction. This format comprises an instruction having a maximum of two operands of the general-type addressing mode which are designated by eight bits. There are cases where the total number itself of operands becomes three or more.

Symbol EaM 244 represents the designating field of the destination operand, symbol MM 246 represents the designating field of the destination operand size, EaR 248 represents the designating field of the source operand, and RR 249 represents the designating field of the source operand size.

Some of the G-format instructions comprise an extension part besides the extension part of EaR 248.

Figure 8:
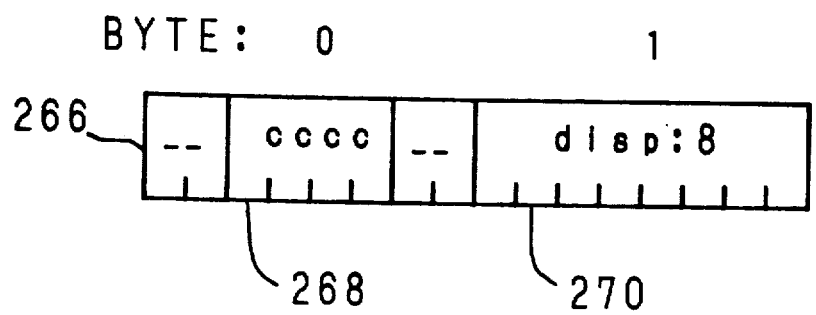

FIG. 8 is a schematic diagram showing a format 266 of a short branch instruction. Symbol cccc 268 represents the designating field of a branch condition, symbol disp:8 270 represents the designating field of displacement to a jump destination, and in the microprocessor of the present invention, when displacement is designated by eight bits, the displacement value is set by doubling the designated value in the bit pattern.

(2.4) "Addressing Mode"

(2.4.1) "Addressing Mode of Microprocessor of the Present Invention"

The methods of designating the addressing mode of the microprocessor of the present invention include the reduced type designated by six bits including the register and the general type designated by eight bits.

Where an undefined addressing mode has been designated, or where a combination of addressing modes obviously unsuitable has been designated, a reserve instruction exception is generated, likewise, the case where the undefined instruction has been executed, and exception processing is started.

Equivalents to the above include the case where the destination is the immediate mode and the case where the immediate mode is used in the designating field of the addressing mode to be accompanied by address calculation.

Meanings of symbols used in the format diagram shown in FIG. 9 to FIG. 19 is as follows:

Rn: Register designating (Sh): Designating method by the reduced-type addressing mode of six bits (Ea): Designating method by the general-type addressing mode of eight bits In the format diagram, the portion surrounded by a broken line shows the extension part.

(2.4.1.1) "Basic Addressing Mode"

The microprocessor of the present invention supports various addressing modes. Among them, the basic addressing modes supported by the microprocessor of the present invention include a register direct mode, a register indirect mode, a register relative indirect mode, an immediate mode, an absolute mode, a Program Counter (PC) relative indirect mode, a stack pop mode and a stack push mode.

Figure 9:
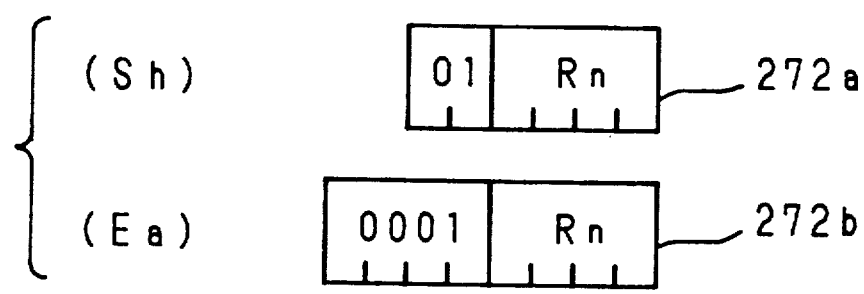

The register direct mode takes the content of a register intact as an operand. FIG. 9 is a schematic diagram of the format thereof. Each symbol Rn 272a, 272b shows the number of the general-purpose register or the FPU register.

Figure 10:
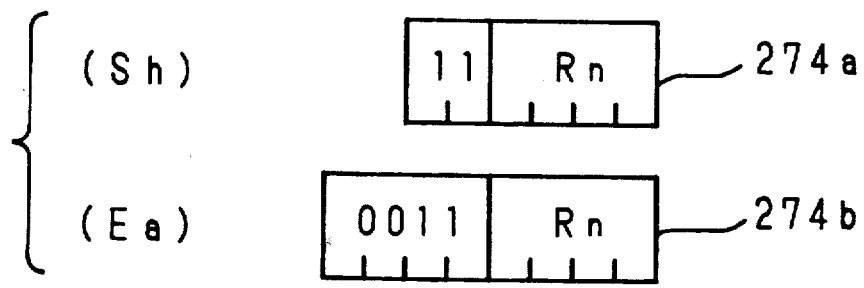

The register indirect mode takes as an operand the content of the memory whose address is the content of a register. FIG. 10 is a schematic diagram of the format thereof. Each symbol Rn 274a, 274b shows the number of the generalpurpose register.

The register relative indirect mode includes two kinds (16 bits and 32 bits) of the displacement value. Each of them takes as an operand the content of the memory whose address is the value of the content of the register added to the displacement value of 16 bits or 32 bits. FIG. 11 is a schematic diagram of the format thereof. Each symbol Rn 276a, 276b, 276c shows the number of the general-purpose register. Each symbol disp: 16 278a, 278b and disp: 32 280 shows the displacement value of 16 bits and the displacement value of 32 bits, respectively. The displacement value is handled with a sign affixed.

The immediate mode takes as an operand the bit pattern designated in the instruction code while assuming it intact as a binary number. FIG. 12 is a schematic diagram of the format thereof. Each symbol imm_data 282a, 282b shows the immediate. The size of imm_data is designated in the instruction as the operand size.

Figure 13:
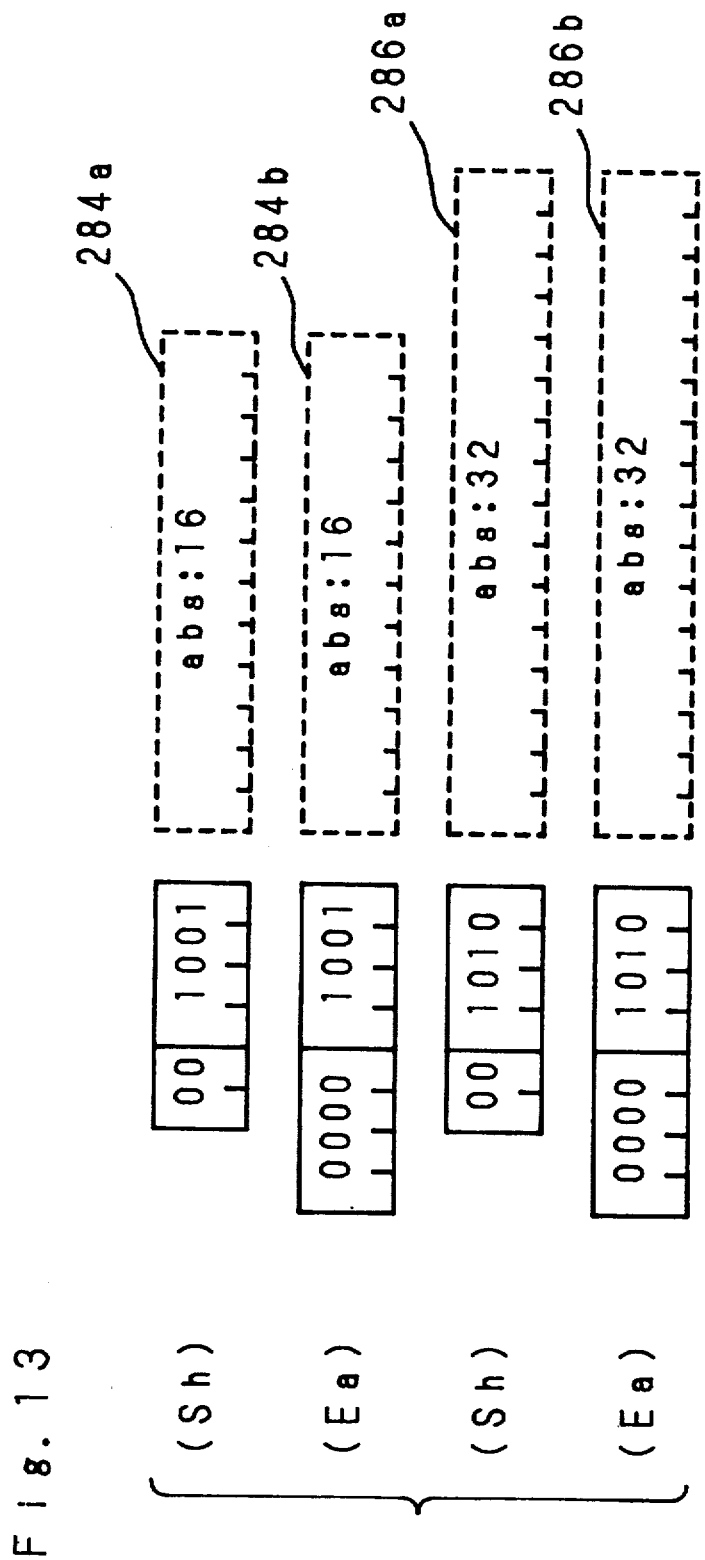

The absolute mode includes two kinds of field (16 bits and 32 bits) for showing the address value. Each kind takes as an operand the content of the memory whose address is the bit pattern of 16 bits or 32 bits designated in the instruction code. FIG. 13 is a schematic diagram showing the format thereof. Each symbol abs: 16 284a, 284b and abs: 32 286a shows the address value of 16 bits and 32 bits, respectively. When the address is shown by abs: 16, the designated address value is sign-extended to 32 bits.

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 14 is a schematic diagram showing the format thereof. Each symbol disp: 16 286a, 286b and disp: 32 288a, 288b shows the displacement value of 16 bits and the displacement value of 32 bits, respectively. The displacement value is handled with a sign affixed. In the PC relative indirect mode, the value of the program counter to be referred is the head address of the instruction comprising the operand. Where the value of the program counter is referred in the chained addressing mode, the head address of the instruction is also used as a reference value of PC relativity.

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop mode for operants of sizes of 8 bits, 16 bits and 64 bits can also be performed, and the SP is renewed (incremented) by +1, +2 and +8, respectively. FIG. 15 is a schematic diagram of the format thereof. As to the one wherein the stack pop mode is invalid for the operand, a reserve instruction exception is generated. Specifically, the stack pop mode designating for a write operand and a read-modify-write operand becomes the reserve instruction exception.

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to designate the stack push mode for operands of sizes of 8 bits, 16 bits and 64 bits, and the SP is renewed (decremented) by −1, −2 and −8, respectively. FIG. 16 is a schematic diagram showing the format thereof. As to the one wherein the stack push mode is invalid for the operand, a reserve instruction exception is generated. Specifically, the stack push mode designating a read operand and a read-modify-write operand becomes the reserve instruction exceptions.

(2.4.1.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the microprocessor of the present invention is an addressing mode based on such a conception. A complicated addressing mode is particularly useful for data reference between modules or the processing system of AI (Artificial Intelligence) language.

When designating the chained addressing mode, in the basic addressing mode designated field, one is designated from among three kinds of designating methods viz. a register base chained addressing mode, a PC base chained addressing mode and an absolute chained addressing mode.

The register base chained addressing mode is an addressing mode taking the value of register as the base value of the chained addressing to be extended. FIG. 17 is a schematic diagram showing the format 294 thereof. Symbol Rn 296 shows the number of the general-purpose register.

The PC base chained addressing mode is an addressing mode taking the value of the program counter (PC) as the base value of the chained addressing to be extended. FIG. 18 is a schematic diagram showing the format 298 thereof.

The absolute base chained addressing mode is an addressing mode taking zero as the base value of the chained addressing to be extended. FIG. 19 is a schematic diagram of the format 300 thereof.

The chained addressing mode designating field to be extended takes 16 bits as a unit, and this is repeated number of times. In each stage of the chained addressing mode, addition of displacement, scaling (×1, ×2, ×4, ×8) and addition of an index register, and indirect reference of memory are performed. FIG. 20 is a schematic diagram showing the format 302 of the chained addressing mode. Each field has meanings as shown below.

E=0: Chained addressing mode is continued.
E=1: Address calculation ends.

tmp→address of operand

I=0: No memory indirect reference is performed.

tmp+disp+Rx*Scale →tmp

I=1: Memory indirect reference is performed.

mem[tmp+disp+Rx*Scale]→tmp

M=0: <Rx> is used as an index.
M=1: Special index
    <Rx> =0 Index value is not added (Rx=0).
    <Rx> =1 Program counter is used as an index value (Rx=PC).
    <Rx> =2 or more Reserved.

D=0: The value of field d4 of four bits in the chained addressing mode is quadrupled to be taken as a displacement value, and this value is added. The d4 is handled with a sign affixed, and is used by surely quadrupling it irrespective of the size of the operand.

D=1: The dispx (16/32 bits) designated in the extension part of the chained addressing mode is taken as a displacement value, the size of the extension part whereto this value is added is designated in the d4 field.

| d4 = 0001 | dispx: 16 bits |
|---|---|
| d4 = 0010 | dispx: 32 bits |

XX: Index scale (scale=1/2/4/8)

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

FIGS. 21 and 22 show variations on the instruction format formed by the chained addressing mode.

FIG. 21 shows variations of continuation 304 and completion of the chained addressing mode.

FIG. 22 shows variations 308a, 308b, 308c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(2.4.2) "Addressing Modes of Coprocessor"

In the coprocessor instruction of the coprocessor of the present invention, various addressing modes are supported such as an FPU register direct mode, an MPU register indirect mode, an MPU register relative indirect mode, an immediate mode, an absolute mode, a PC relative indirect mode, a stack pop mode, and a stack push mode.

The FPU register direct mode takes the content of the FPU register intact as an operand.

The MPU register indirect mode takes the content of a memory of the address of the content of a general-purpose register of the main processor as an operand.

The MPU register relative indirect mode is classified into two kinds depending on whether the displacement value is 16 bits or 32 bits. Each kind of this mode takes the content of a memory whose address is the content of the general-purpose register of the main processor added by a displacement value of 16 bits or 32 bits as an operand.

The immediate mode assumes a bit pattern specified in an instruction code intact to be a binary number or a floating point number and takes it as an operand.

The absolute mode is classified into two kinds depending on whether the address value is shown by 16 bits or 32 bits. Each kind of this mode takes the content of a memory whose address is a bit pattern of 16 bits or 32 bits specified in the instruction code as an operand.

The PC relative indirect mode is classified into two kinds depending on whether the displacement value is 16 bits or 32 bits. Each kind of this mode takes the content of a memory whose address is the content of a program counter added by a displacement value of 16 bits or 32 bits as an operand.

The stack pop mode takes the content of a memory whose address is the content of a stack pointer (SP) as an operand. In this mode, after operand access, the SP is incremented by the operand size. For example, when data of 32 bits is handled, the SP is renewed by +4 after operand access. Specifying of the stack pop mode for an operand of the size of 8 bits, 16 bits or 64 bits is also can be made and the SP is renewed by +1, +2 or +8, respectively.

The stack push mode takes the content of a memory whose address is the content of the SP decremented by the operand size as an operand. In the stack push mode, the SP is decremented before operand access. For example, when data of 32 bits is handled, the SP is renewed by −4 before operand access. Specifying of the stack push mode for an operand of the size of 8 bits, 16 bits or 64 bits is also possible, and the SP is renewed by −1, −2 or −8, respectively.

Basically, even a complicated addressing is decomposed into a combination of addition and indirect reference. Accordingly, addition and operation of indirect reference are given in advance as primitives of addressing, and if they can be combined arbitrarily, any complicated addressing can be realized. A chained addressing mode of the instruction of the coprocessor of the present invention is based on such an idea. A complicated addressing mode is useful particularly for data reference among modules or the processing system of AI (Artificial Intelligence) language.

In specifying the chained addressing mode, in a basic addressing mode specifying field, any one of three kinds of specifying methods of a register base chained addressing mode, a PC base chained addressing mode and an absolute base chained addressing mode is specified.

The register base chained addressing mode in an addressing mode taking the value of the general-purpose register of the main processor as a base value of the chained addressing to be extended.

The PC base chained addressing mode is an addressing mode taking the value of the program counter as a base value of the chained addressing to be extended.

The absolute base chained addressing mode is an addressing mode taking zero as a base value of the chained addressing to be extended.

A chained addressing mode specifying field to be extended takes 16 bits as a unit, and repeats this unit an arbitrary number of times. By the one-stage chained addressing mode, addition of displacement, scaling (×1, ×2, ×4, ×8) and addition of an index register and indirect reference of a memory are performed.

If the chained addressing of an arbitrary number of stages can be utilized, case sorting based on the number of stages in a compiler can be dispensed with, and therefore an advantage of reducing the duty of the compiler is obtained. This is because even if the frequency of multi-stage indirect reference is very small, the compiler must be able to generate a correct code without fail. For this reason, an arbitrary number of stages can be provided in the format.

(3) "Coprocessor Command of Microprocessor of the Present Invention"

Figure 23:
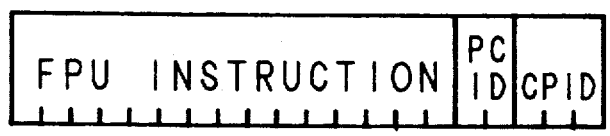
FIG. 23 is a schematic diagram showing a format of a command transferred from the microprocessor to the coprocessor of the present invention.
Figure 24:
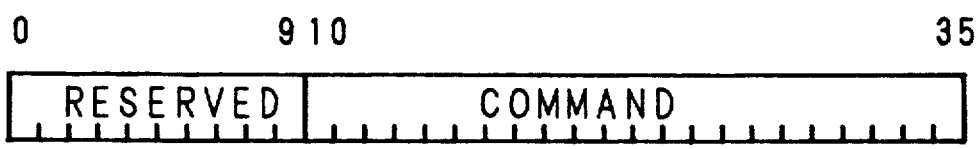
FIG. 24 is a schematic diagram showing a transfer bit position when a command is transferred from the microprocessor to the coprocessor of the present invention through an address bus.

Instructions of the microprocessor of the present invention comprises a coprocessor instruction executed by the FPU 11 and 12. The coprocessor instruction is decoded by the MPU 10, and thereafter it is transferred to the FPU 11 (12) as a command, and is executed by the FPU 11 (12). The command has a format as shown in FIG. 23, and as shown in FIG. 24, it is transferred using low-order 20 bits of an address bus 2.

The command is constituted with a FPU instruction field, a PCID field and a CPID field. The FPU instruction field is an operation specifier showing the content of the instruction for the FPU 11 (12). The PCID field shows the number for discriminating the PC value of the coprocessor instruction held in the MPU 10, and is the number for selecting the PC value of the coprocessor instruction having caused an exception from among a plurality of PC values held in the MPU 10 when the exception has been generated in the FPU 11. The CPID shows the value of the CPID field of the processor status word (PSW) of the MPU 10, and is the number for discriminating each FPU when a plurality of FPUs are connected to the MPU 10.

Figure 25:
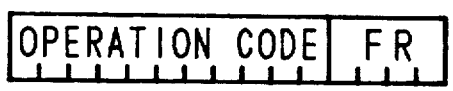
FIG. 25 through FIG. 27 are schematic diagrams showing formats of FPU instructions in the command transferred from the microprocessor to the coprocessor of the present invention.
Figure 26:
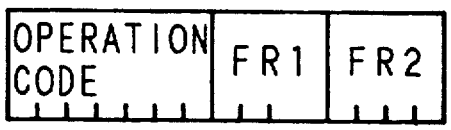
Figure 27:

The FPU instruction has formats as shown in FIG. 25 through FIG. 27. A memory-FPU register instruction (M-FR instruction), a MPU register-FPU register instruction (GR-FR instruction and a one-operand instruction are constituted with an operation code field and an FPU register number field (FR), and have the format as shown in FIG. 25. The FPU register-FPU register instruction (FR-FR instruction) is constituted with an operation code field and two FPU register number fields (FR 1 and FR 2), and has the format as shown in FIG. 26. The zero operand field has the format as shown in FIG. 27.

(4) "Configuration of Function Block of Microprocessor of the Present Invention"

Figure 28:
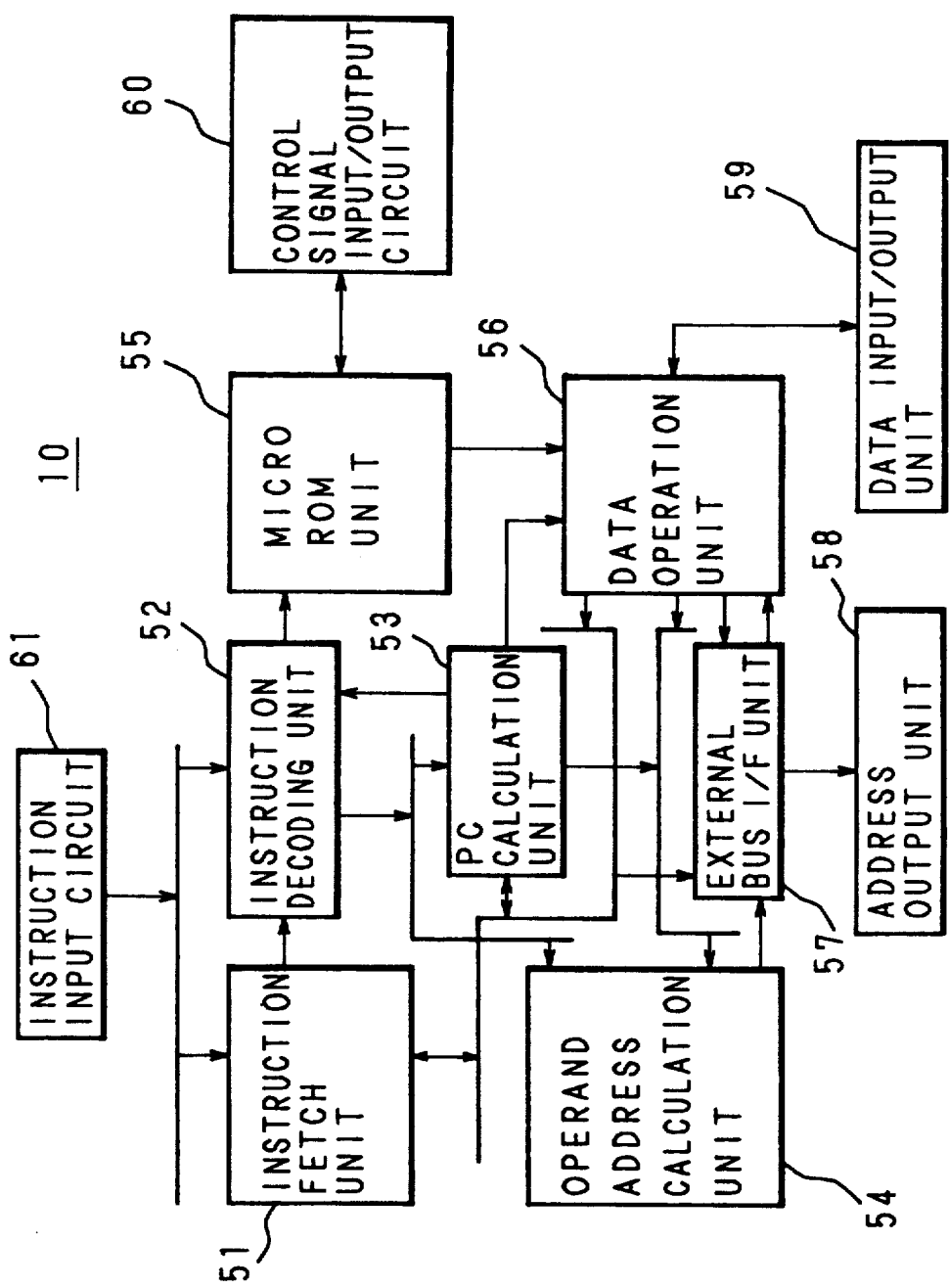
FIG. 28 is a block diagram showing a configuration example of the microprocessor of the present invention.

FIG. 28 is a block diagram showing a configuration of the microprocessor (the MPU 10 in FIG. 3) of the present invention.

The interior of the microprocessor of the present invention is functionally divided roughly into an instruction fetch unit 51, an instruction decoding unit 52, a PC calculation unit 53, an operand address calculation unit 54, a micro ROM unit 55, a data operation unit 56 and an external bus interface unit 57.

In FIG. 28, in addition to the above-described units, an address output circuit 58 for outputting address to the exterior of the MPU 10, a data input/output circuit 59 for inputting and outputting data from and to the exterior of the MPU 10, a control signal input/output unit 60 and an instruction input circuit 61 for inputting an instruction code are shown being separated from the other function block units.

(4.1) "Instruction Fetch Unit"

The instruction fetch unit 51 which comprises an instruction cache, an instruction queue and a controlling unit thereof, determines the address of an instruction to be fetched next and fetches the instruction from the instruction cache or a memory system 13 outside the MPU 10. It also performs instruction registering to the instruction cache.

The address of an instruction to be fetched next is calculated by a dedicated counter as the address of the instruction to be inputted to an instruction queue. In the case where a jump is generated, an address of a new instruction of jump target is transferred from the PC calculation unit 53 or the data operation unit 56.

In the case where an instruction is fetched from a memory outside the MPU 10, the address of the instruction to be fetched is outputted from the address output circuit 58 to the outside of the MPU 10 through the external bus interface unit 57, and an instruction code is fetched from the instruction input circuit 61.

Then, among the instruction codes in buffering, the instruction code to be decoded next is outputted to the instruction decoding unit 52.

(4.2) "Instruction Decoding Unit"

In the instruction decoding unit 52, basically an instruction code is decoded on a 16-bit (half word) basis. This instruction decoding unit 52 comprises a FHW decoder for decoding an operation code included in the first half word, a NFHW (not first half word) decoder for decoding an operation code including in the second and the third half words, and an addressing mode decoder for decoding an addressing mode. These FHW decoder, NFHW decoder and addressing mode decoder are generally called a first decoder.

There are also a second decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 52 decodes the instruction code being inputted from the instruction fetch unit 51 by 0 through bytes per one clock. Among the results of decoding, information on operation in the data operation unit 56 is outputted to the micro ROM unit 55, information on operand address calculation is outputted to the operand address calculation unit 54, and information on PC calculation is outputted to the PC calculation unit 53, respectively.

(4.3) "Micro ROM Unit"

The micro ROM unit 55 comprises a micro ROM for storing various microprograms which mainly controls the data operation unit 56, a micro sequencer, and a micro instruction decoder. A micro instruction is read out from the micro ROM once per one clock. The micro sequencer accepts processings of exception, interruption and trap (these three are generally called EIT) and test interruption in a hardware manner in addition to the sequential processings shown by the microprograms. The micro ROM unit 55 also controls a store buffer.

To the micro ROM unit 55, there are inputted flag information generated by interruption independent of the instruction code or by the result of operation execution, and output of an instruction decoding unit such as output of a second decoder.

Output of the micro decoder is mainly given to the data operation unit 56, but some information such as information of stopping other preceding processing due to execution of a jump instruction is outputted also to other blocks.

(4.4) "Operand Address Calculation Unit"

The operand address calculation unit 54 is controlled in a hardwired manner by information on operand address calculation outputted from the address decoder of the instruction decoding unit 52 or the like. In this operand address calculation unit 54, substantially all processing on operand address calculations is performed. Checking is conducted to determined whether or not the address of memory access for memory indirect addressing and the operand address can be entered in an I/O area mapped in the memory. Also, operand address calculation of a coprocessing instruction is performed in this operand address calculation unit 54.

The result of address calculation is sent to the external bus interface unit 57. The values of the general-purpose register and the program counter required for address calculation are inputted from the data operation unit 56.

In performing the memory indirect addressing, the memory address to be referred is outputted from the address output circuit 58 to the outside of the MPU 10 through the external bus interface unit 57, and the indirect address is fetched from the data input/output unit 59.

(4.5) "PC Calculation Unit"

The PC calculation unit 53 is controlled in hardwired manner using information on PC calculation outputted from the instruction decoding unit 52. The PC calculation unit 53 calculates the PC value of an instruction. The microprocessor of the present invention has a variable-length instruction set, and the length of that instruction can be found only after the instruction is decoded. For this reason, the PC calculation unit 53 generates the PC value of the next instruction by adding the length of the instruction outputted from the instruction decoding unit 52 to the PC value of the instruction in decoding.

The result of calculation in the PC calculation unit 53 is outputted as the PC value of each instruction together with the result of decoding of the instruction.

(4.6) "Data Operation Unit"

The data operation unit 56 is controlled by microprograms, and executes the operation required for realizing the function of each instruction by means of registers and an arithmetic unit according to output information of the micro ROM unit 55.

In the case where the operand to be operated by an instruction is an address or an immediate, the address or the immediate calculated in the operand address calculation unit 54 is obtained by passing it through the external bus interface unit 57 to the data operation unit 56. In the case where the operand to be operated on is in a memory, the external bus interface unit 57 outputs the address calculated in the address calculation unit 54 from the address output circuit 58, and the operand fetched from the memory system 13 is obtained through the data input/output circuit 59 to the data operation unit 56.

For a coprocessing instruction, the data operation unit 56 transfers necessary command and operand by predetermined coprocessor protocol according to a microprogram through the external bus interface unit 57, the address output circuit 58, the data input/output unit 59, the control signal output/input unit 60 and the like.

In the case where an access to the memory system 13 is required at the data operation, the address is outputted from the address output circuit 58 to the outside of the MPU 10 through the external bus interface unit 57 by the direction of the microprogram, and the target data is fetched through the data input/output circuit 59.

In the case where data is stored in the memory system 13, the address is outputted from the address output circuit 58 through the external bus interface unit 57, and simultaneously the data is outputted from the data input/output circuit 59 to the outside of the MPU 10. In order to efficiently perform an operand store, a four-byte store buffer is installed in the data operation unit 56.

In the case where the data operation unit 56 obtains a new instruction address by processing a jump instruction or an exceptional processing, the data operation unit 56 outputs the new instruction address to the instruction fetch unit 51 and the PC calculation unit 53.

Figure 29:
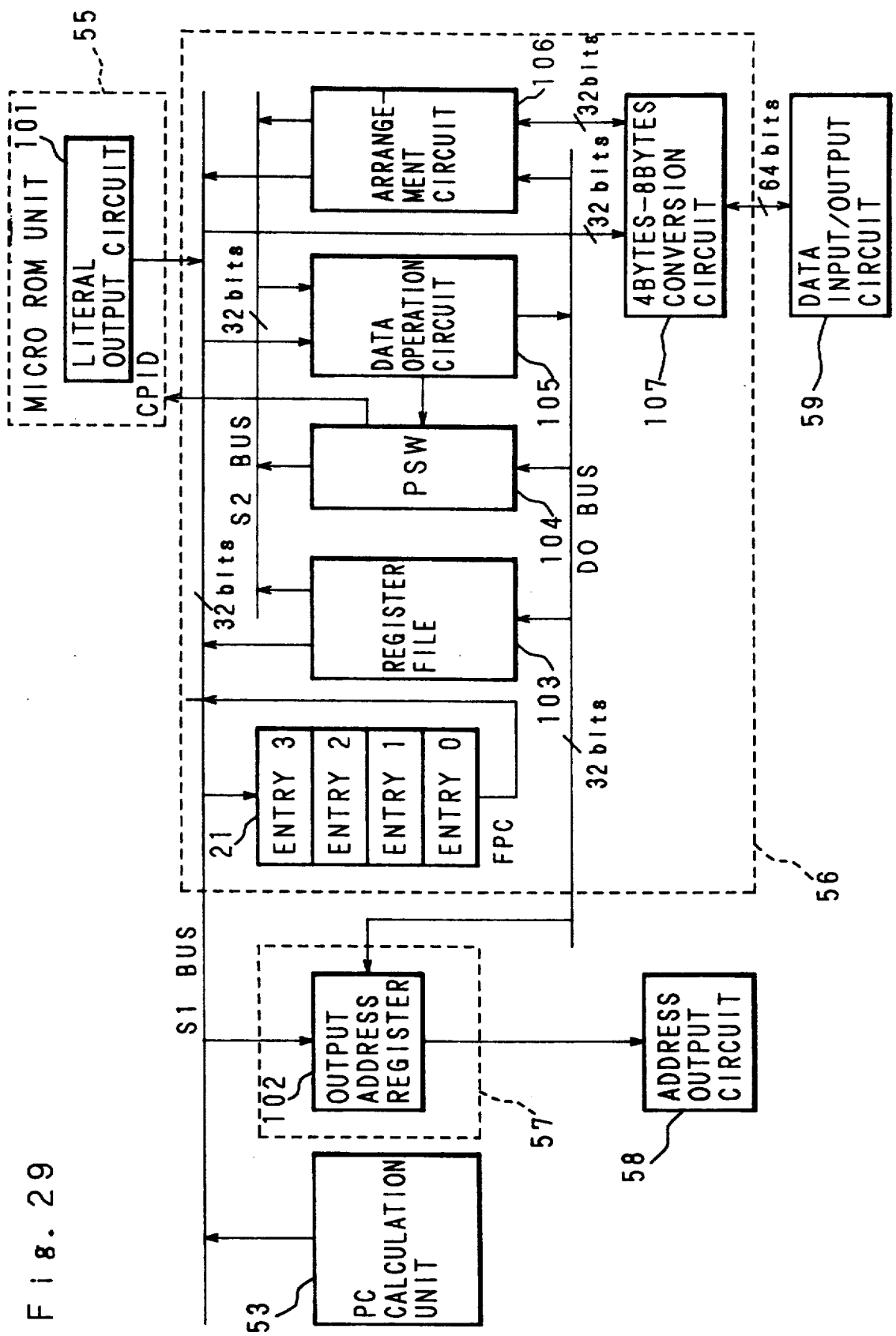
FIG. 29 is a block diagram showing a detailed configuration of a data operation unit of the microprocessor of the present invention and portions relating thereto.

FIG. 29 is a block diagram of a detailed configuration of a data operation unit 56, a part of a micro-ROM unit 55 and a part of a bus interface unit 57 of the microprocessor of the present invention.

The data operation unit 56 is provided with a register file 103 consisting of a general-purpose register and a working register, a processor status word (PSW) consisting of status bits of the processor and a flag, a data operation circuit 105 consisting of an ALU, a barrel shifter and the like, an arrangement circuit 106 arranging words by rotating data in byte unit in sending and receiving data to and from a memory, a four bytes-eight bytes conversion circuit 107 converting data between eight-byte external buses and four-byte internal buses, an S1 bus, an S2 bus and a D0 bus which are the internal data buses, a PC queue 21 holding a maximum of four PC values of coprocessor instructions in transferring commands to coprocessors according to the coprocessor instructions, and the like.

The main arithmetic units are connected to one another by the S1 bus, the S2 bus and the D0 bus, and one microinstruction directing one register-register operation is processed on one clock cycle.

Each PC value of coprocessor instructions held in the PC queue 21 is read by the exception processing handler and is used when that coprocessor instruction has caused an exception such as an overflow, an underflow or a zero division. Also, the values are written in a cyclic fashion to four entries of the PC queue 21, and at a fifth write-in, value is overwritten in the PC value of the entry written first. Thereby, the four newest PC values are held in the PC queue 21 all the time.

Figure 30:
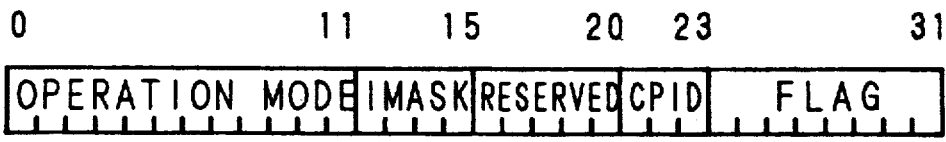
FIG. 30 is a schematic diagram showing content of a PSW of the microprocessor of the present invention.

FIG. 30 is a schematic diagram showing a configuration of the PSW 104.

The PSW 104 is constituted with an operation mode field showing the operating mode of the processor, an IMASK field showing the mask level of an external interrupt, a CPID field used for identifying the coprocessor of transfer destination in transferring the command to the coprocessor, and a flag field changed by the result of operation such as a carry or a zero flag.

(4.7) "External Bus Interface Unit"

The external bus interface unit 57 controls communication through input/output pins of the microprocessor of the present invention. Accesses to memories are all performed with clock-synchronizing, and can be performed on a minimum of two clock cycles.

The external bus interface unit 57 is provided with a data cache, and when a read-out of an operand hits the data cache, memory access is not performed. A write-in of an operand is performed to both of the data cache and the memory. When the coprocessor writes an operand to the memory, it reads the operand through a data input/output circuit 58, and changes the content of the data cache of the same address.

Access requests to the memory take place independent of an instruction fetch unit 51, an address calculation unit 54 and the data operation unit 56. The external bus interface unit 57 arbitrates these access requests. Furthermore, in accessing data located at the memory address crossing the arrangement boundary of 64 bits (double words) which is the size of the data bus connecting the memory and the microprocessor of the present invention, that is detected automatically, and the access is performed while divided into memory accesses of two times.

Conflict preventing processing where an operand to be prefetched and an operand to be stored are overlapped and bypass processing from a stored operand to a fetched operand are also performed in this external bus interface unit 57.

(5) "Pipeline Processing of Microprocessor of the Present Invention"

The microprocessor of the present invention performs high performance by pipeline processing of instructions. At first, description is made on a method of pipeline processing of the microprocessor of the present invention.

(5.1) "Pipeline Processing Mechanism of Microprocessor of the Present Invention"

Figure 31:
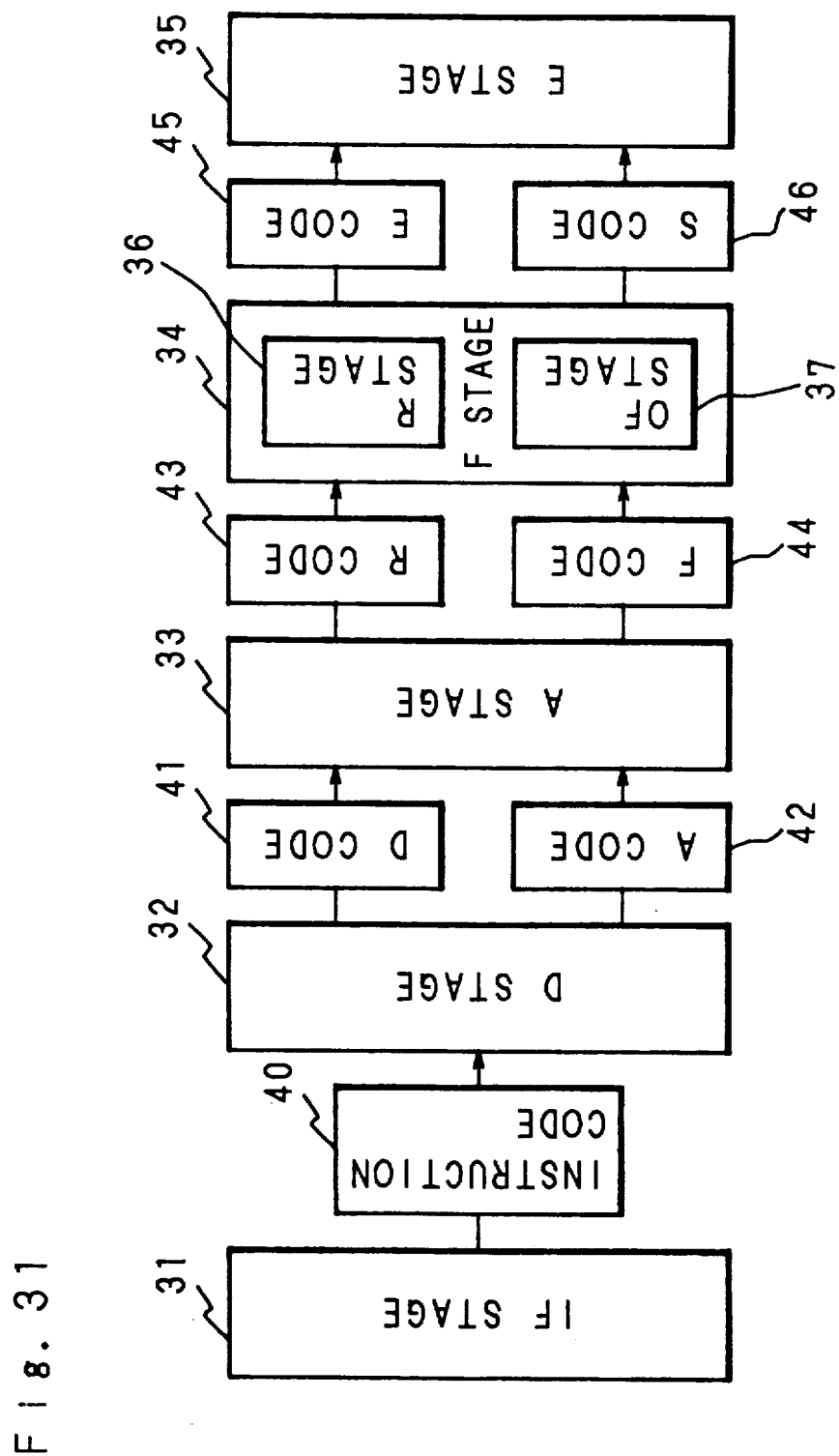
FIG. 31 is a schematic diagram showing an outline of pipelined processing of the microprocessor of the present invention.

FIG. 31 is a schematic diagram showing a pipeline processing mechanism of the microprocessor of the present invention.

The basis of pipeline processing has a five-stage configuration which comprises an instruction fetch stage (IF stage) 31 for prefetching an instruction, a decoding stage (D stage) 32 for decoding the instruction, an operand address calculation stage (A stage) 33 for performing address calculation of an operand, an operand fetch stage (F stage) 34 consisting of a portion for performing micro ROM access (particularly called an R stage 36) and a portion for prefetch an operand (particularly called an OF stage 37), and an execution stage (E stage) 35 for executing an instruction.

The E stage 35 comprises a one-stage store buffer, and besides, in some high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of one clock cycle. Accordingly, ideally, the pipeline processing progresses one after another on a one clock basis.

The microprocessor of the present invention comprises some instructions which cannot be processed only by the basic pipeline processing of one time such as an operation between memory and memory or a memory indirect addressing, but the microprocessor of the present invention is designed in such a manner that a balanced pipeline processing can be performed whenever possible for processing of these instructions. For the instruction having a plurality of memory operands, pipeline processing is performed based on the number of memory operands by decomposing it into a plurality of pipeline processing units (step code) at the decoding stage.

A detailed description of the decomposing method of the pipeline processing unit is disclosed in Japanese Patent Application Laid-Open No. 63-89932 (1988) (incorporated herein by reference).

Information transferred from the IF stage 31 to the D stage 32 is an instruction code itself. Information transferred from the D stage 32 to the A stage 33 includes two kinds of information, one on operation designated by an instruction (called a D code 41) and the other on address calculation of an operand (called an A code 42).

Information transferred from the A stage 33 to the F stage 34 includes an R code 43 comprising an entry address of a microprogram or a parameter of the microprogram and an F code 44 comprising an operand address and information on directing the method of access.

Information transferred from the F stage 34 to the E stage 35 is an E code 45 comprising operation control information and literal and an S code 46 comprising an operand or an operand address.

EIT detected in the stage other than the E stage 35 does not start the EIT processing until the code thereof reaches the E stage 35. This is because only the instruction processed in the E stage 35 is an instruction at the step of executing, and the instructions having been processed between the IF stage 31 and the F stage 34 do not reach the step of executing yet. Accordingly, for the EIT detected in the stage other than the E stage 35, the detection thereof is recorded in the step code, and it is only transmitted to the following stage.

(5.2) "Processing of Each Pipeline Stage"

Figure 33:
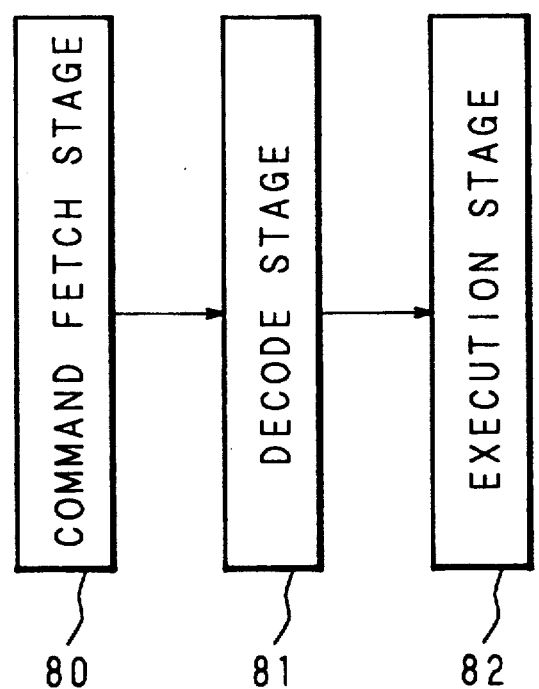
FIG. 33 is a schematic diagram showing an outline of pipelined processing of the coprocessor of the present invention.

As shown in FIG. 33, for the sake of convenience, names are given to the input and output step codes of each pipeline stage. The step codes perform processing relating to the operation codes, and include two series; a series becoming entry addresses of microprograms and parameters for the E stage 35 and a series becoming operands for microinstructions of the E stage 35.

(5.2.1) "Instruction Fetch Stage"

The instruction fetch stage (IF stage) 31 fetches an instruction from the instruction cache or the memory system 13, inputs it to the instruction queue, and outputs an instruction code to the D stage 32. Input of the instruction queue is performed in an aligned four-byte unit. In the case where an instruction is fetched from the memory system 13, a minimum of one clock cycle is required for the aligned four bytes. In the case where the instruction cache hits, fetching can be made in one clock per aligned four bytes. The output unit of the instruction queue is variable on a two-byte basis, and a maximum of six bytes can be outputted during one clock. Immediately after a jump, two bytes of the instruction base part can also be transferred directly to the instruction decoder by by-passing the instruction queue.

Control of registering, clearing and the like of the instruction to the instruction cache, management of addresses of the instructions to be prefetched and control of the instruction queue are also performed in the IF stage 31.

(5.2.2) "Instruction Decoding Stage"

The instruction decoding stage (D stage) 32 decodes an instruction code inputted from the IF stage 31. Decoding is performed by one clock cycle basis using the first decoder consisting of the FHW decoder, the NFHW decoder and the addressing mode decoder in the instruction decoding unit 52. An instruction code of 0 to 6 bytes is consumed in the decoding processing during one operation thereof (no instruction code is consumed in the outputting processing of the step code comprising the return address of the RET instruction). By one operation of the decoding unit, the control code which is the A code 42 as address calculation information, address modification information, the control code which is the D code 41 as the result of intermediate decoding of the operation code, and eight-bit literal information are inputted to the A stage 33.

In the D stage 32, control of the PC calculation unit 53 for each instruction, and outputting processing of the instruction code from the instruction queue are also performed.

(5.2.3) "Operand Address Calculation Stage"

Processing functions of the operand address calculation stage (A stage) 33 are roughly divided into two parts. One is processing for post-decoding of the operation code using the second decoder of the instruction decoding unit 52 and the other is for calculation of an operand address in the operand address calculation unit 54.

The post-decoding processing of the operation code inputs the D code 41 and outputs the R code 43 comprising write reserve of register and memory, an entry address of a microprogram and parameters for the microprogram. In addition, the write reserve of the register or memory is for preventing a wrong address calculation by re-writing the content of the register or memory referred in the address calculation with the instruction preceding on the pipeline.

The operand address calculation processing inputs the A code 42, performs addition in the operand address calculation unit 54 according to the A code 42 or performs address calculation by combining memory indirect reference, and outputs the result of the calculation as the F cord 44. At this time, a conflict check is done in reading-out of the register and the memory attending on the address calculation. If a conflict is indicated because the preceding instruction has not completed the writing processing to the register or the memory, the processing waits until the preceding instruction completes the write processing in the E stage 35.

(5.2.4) "Micro ROM Access Stage"

Processing of the operand fetch stage (F stage) 34 is also divided roughly into two parts. One is access processing of the micro ROM, particularly called the R stage 36. The other is operand prefetch processing, particularly called the OF stage 37. The R stage 36 and the OF stage 37, which do not necessarily operate at the same time, operate independently depending on whether or not the memory access right can be acquired.

The micro ROM access processing which is the processing of the R stage 36 is the micro ROM access and micro instruction decoding processing for generating the E code 45 which is an execute control code used for execution in the following E stage 35 for the R code 43. In the case where processing for one R code 43 is decomposed into two or more microprogram steps, the micro ROM is used in the E stage 35, and the following R code 43 waits for micro ROM access. Micro ROM access using the R code 43 is performed when the last micro instruction is executed in the preceding E stage 35. In the microprocessor of the present invention, almost all of the basic instructions are executed in one microprogram step, therefore, there are many actual cases in which the micro ROM accesses to the R code 43 are performed one after another.

(5.2.5) "Operand Fetch Stage"

The operand fetch stage (OF stage) 37 performs operand prefetch processing among the above-mentioned two processings performed in the F stage. An operand is prefetched from the data cache or memory system 13.

Operand prefetch processing inputs the F code 44 and outputs the fetched operand and the address thereof as the S code 46. One F code 44 may cross over the double word boundary, but designates operand fetching of eight bytes or less. The F code 44 also comprises designating of whether or not access to the operand is to be performed. In the case where the operand address itself or the immediate calculated in the A stage 33 is transferred to the E stage 35, no operand prefetch is performed, and the content of the F code 44 is transferred as the S code 46. In the case where the operand intended to be prefetched coincides with the operand intended to be write-processed in the E stage 35, no operand prefetching is performed from the data cache or memory, but operation of the prefetch is performed by by-passing it.

(5.2.6) "Execution Stage"

The execution stage (E stage) 35 operates with the E code 45 and the S code 46 taken as inputs. This E stage 35 is a stage for executing instructions, and all processings performed in the stages before and in the F stage 34 are pre-processings for the E stage 35. In the case where a jump instruction is executed in the E stage 35 or the EIT processing is started, all the processings from the IF stage 31 to the F stage 34 are disabled. The E stage 35 is controlled by microprograms, and the instruction is executed by executing a series of microprograms starting with the entry address of microprogram indicated in the R code 43.

Read of the micro ROM and execution of the microinstruction are performed in a pipeline manner. Accordingly, in the case where a branch takes place in the microprogram, a gap (blank) of one microstep is generated. The E stage 35 can also perform pipeline processing of an operand store of four bytes or less and the following microinstruction execution by utilizing the store buffer in the data operation unit 56.

In the E stage 35, the write reserve to the register and the memory performed in the A stage 33 is released after write of the operand.

In the case where a conditional branch instruction generates a branch in the E stage 35, the branch prediction for that conditional branch instruction has been wrong, and therefore rewriting of the branch history is performed.

The EITs detected in the E stage 35 include bus access exception, address conversion exception, debugging trap, odd address jump trap, reserve function exception, wrong operand exception, reserve stack format exception, zero division trap, unconditional trap, conditional trap, delayed context trap, external interruption, delay interruption, reset interruption and system faults.

The EITs detected in the E stage 35 are all EIT-processed, but the EITs which are detected between the IF stage 31 and the F stage 34 before the E stage 35 and are reflected in the R code 43 or the S code 46 are not necessarily EIT-processed. All the EITs which are detected among from the IF stage 31 to the F stage 34, but do not reach the E stage 35 because the preceding instruction has executed a jump instruction in the E stage 35 or the like are all canceled. The instruction having caused that EIT is assumed to have not been executed from the beginning.

Various interruption are accepted directly to the E stage 35 at a timing of a pause of the instruction, and necessary processing is executed by microprograms. Processings of other various EITs are performed by microprograms.

(5.3) "Status Control of Each Pipeline Stage"

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

In other words, it is required that all input signals are prepared at a timing with one clock before the operation start in each stage. If the input signals are not all prepared, that stage is put in the waiting state (input waiting). If transfer from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(6) "Configuration of Function Blocks of Coprocessor"

Figure 32:
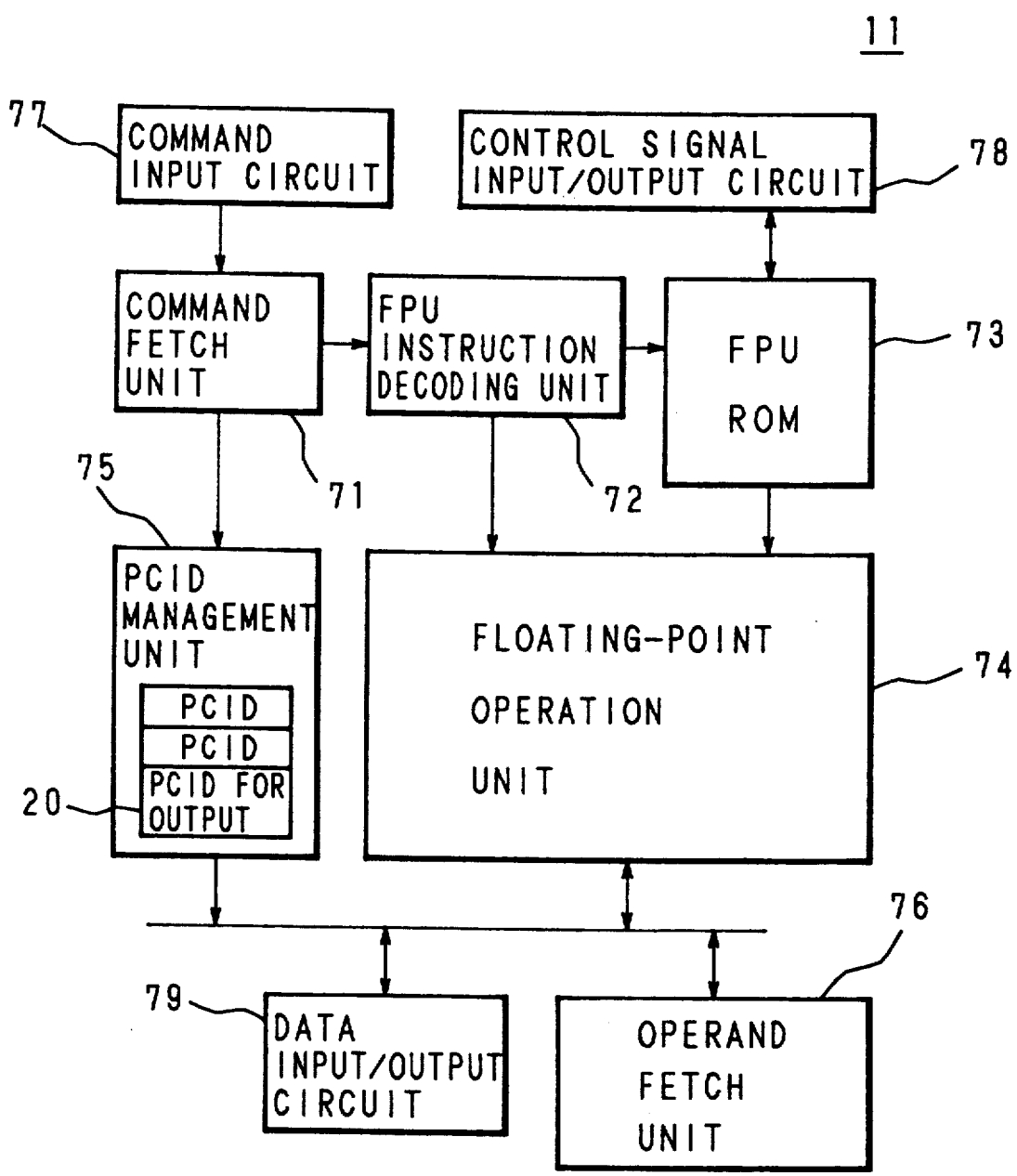
FIG. 32 is a block diagram showing a configuration example of the coprocessor of the present invention.

FIG. 32 is a block diagram showing a configuration sample of the coprocessor (the first FPU 11 in FIG. 3) of the present invention.

The interior of the coprocessor of the present invention is roughly divided on a function basis into a command fetch unit 71, an FPU instruction decode unit 72, an FPU micro-ROM unit 73, a floating-point operation unit 74, a PCID management unit 75 and an operand fetch unit 76.

In addition to the above, FIG. 32 shows a data input/output circuit 79 inputting/outputting data from/to the outside, a control signal input/output circuit 78 and a command input circuit 77 inputting a command separately from the above-described function block part.

The command fetch unit 71 is provided with a command register and a control part, and among commands transferred from the MPU 10 through the command input circuit 77, the command whose CPID is "001" is fetched into the command register. Among the contents of the command register, the FPU instruction field is transferred to the FPU instruction decode unit 72, and the PCID of the PCID field is transferred to the management unit 75.

The FPU instruction decode unit 72 decodes the FPU instruction transferred from the command fetch unit 71. The decoded result is outputted to the micro-ROM unit 73.

The FPU micro-ROM unit 73 comprises, a micro-ROM storing various micro-program routines performing control of the floating-point operation unit 74 and the whole coprocessor, a micro-sequencer, a micro-instruction decoder and the like. The micro-instruction is read from the micro-ROM once in one clock.

The floating-point operation unit 74 is controlled by a micro-program, and executes operation required for realizing the function of each instruction by a register file and an arithmetic unit according to a micro-instruction being an output of the micro-ROM. An operand to be operated is inputted from the operand fetch unit 76. When data is stored in the memory system 13, the data is outputted from the data input/output circuit 79 to the outside of the FPU.

The PCID management unit 75 has a PCID queue 20 which queues and holds the PCID transferred from the command fetch unit 71. The PCID queue 20 is constituted with two entries and an output part, and holds the PCID corresponding to the FPU instruction being decoded by the FPU instruction decode unit 72, the PCID corresponding to the FPU instruction being executed by the floating-point operation unit 74 and the PCID for output.

The operand fetch unit 76 queues and holds the operand which has been transferred from the MPU 10 through the data bus 1 and has been inputted through the data input/output circuit. The operand is outputted when required by the floating-point operation unit 74.

(7) "Pipeline Processing of Coprocessor"

The coprocessor of the present invention demonstrates a high performance by pipeline processing of the command. FIG. 33 is a schematic diagram of pipeline processing of a the coprocessor of the present invention.

The pipeline processing is constituted with three pipeline stages; a command fetch stage 80 fetching a command, a decode stage 81 decoding a FPU instruction and an execute stage 82 executing the command. Each stage is operated independent of the other stages, and a maximum of three commands are fetched simultaneously, being processed.

In the command fetch stage 80, among commands transferred from the MPU 10, the command of CPID="001" is fetched. The fetched command is decomposed into a FPU instruction and a PCID in this stage.

The decode stage 81 is the next stage of the command fetch stage 80, and executes decoding of the FPU instruction and inputting of the PCID to the PCID queue 20.

The execute stage 82 executes the command according to a micro-program. In executing the command, when an exception has occurred, the corresponding PCID is set in the output part of the PCID queue 20, and an interrupt request is outputted.

(8) "Detailed Circuit Connection Diagram of Data Processing System Using Microprocessor and Coprocessors of the Present Invention"

Figure 34:
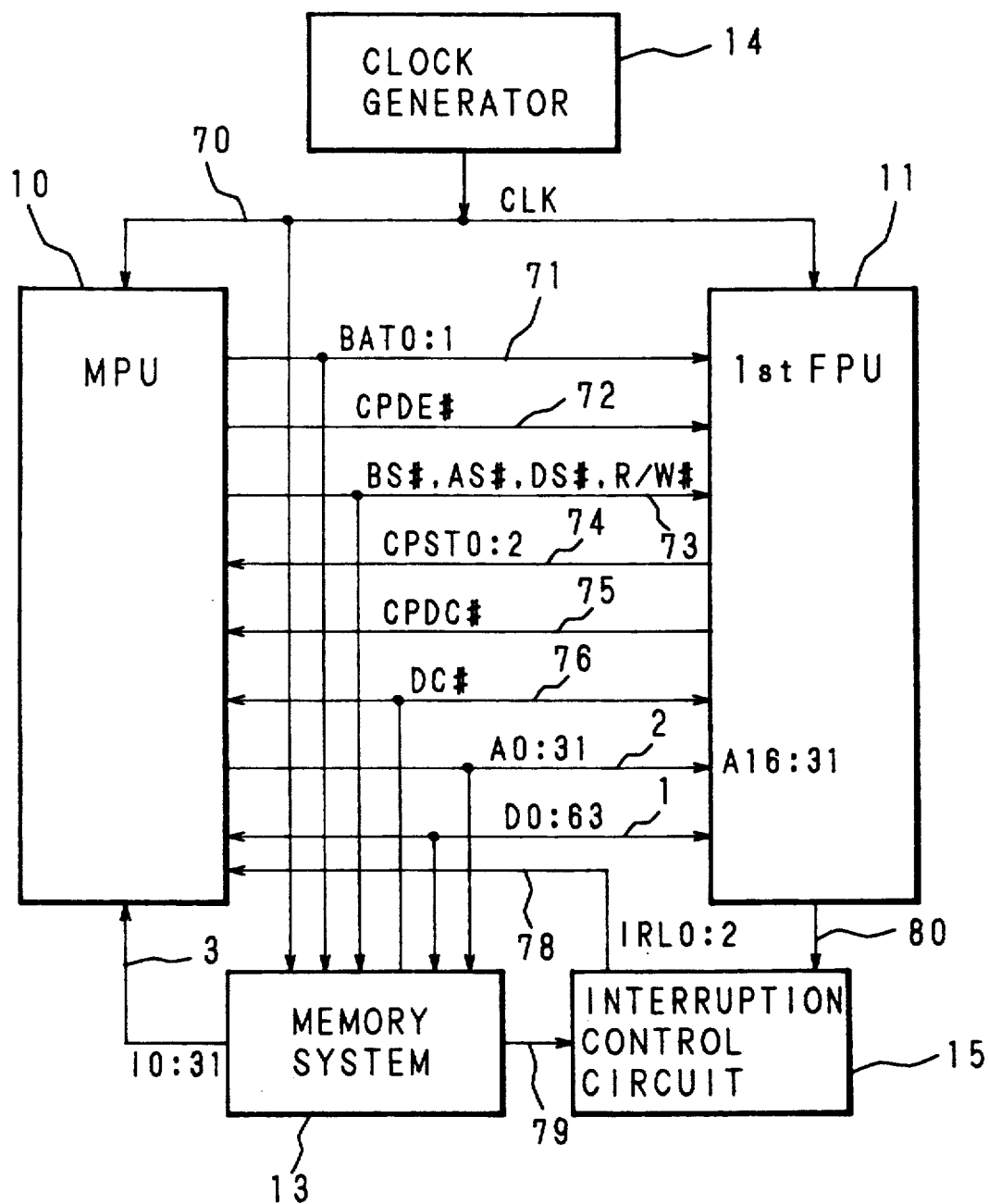
FIG. 34 is a block diagram showing connecting state between the microprocessor and the coprocessor of the present invention.

FIG. 34 shows a relation of connection of a data processing system which employs the microprocessor of the present invention as the MPU 11 and the coprocessor of the present invention as the first FPU 11, and uses the memory system 13, the clock generator 14 and the interrupt control circuit 15.

The first FPU 11 of the system of the present invention can accept a maximum of three coprocessor instructions. The MPU 10 is provided with a PC queue 21 of four-entry. For this reason, the PC value of the FPU instruction held in the PC queue 21 is assured to be held until the corresponding FPU command completes execution in the first FPU 11.

The PC queue 21 necessitates to held the PC value of the FPU instruction until the point when whether or not the FPU generates an exception is made clear because that the PC value is required when the corresponding FPU command has generated an exception in the FPU.

In the system of the present invention, PC values "a", "b", "c" and "d" of four FPU instructions "A", "B", "C" and "D" are stored in the PC queue 21, and when the next FPU instruction "E" is decoded, a PC value "a" written earliest among four PC values "a", "b", "c" and "d" is destroyed and the PC value "e" of the FPU instruction "E" decoded anew is over-written thereon. Then, a FPU command "Ce" for this FPU instruction "E" is transferred to the first FPU 11.

At this time, all of executions of three FPU commands "Cb", "Cc" and "Cd" accepted by the first FPU 11 are not completed, the first FPU 11 does not accept a new command "Ce", and outputs signal "001" to the CPST0:2 to inform the MPU 10 of "busy".

The MPU 10 delivers a value "001" of the CPST0:2 from a control signal input/output circuit 60 to the micro-ROM unit 55. The micro-ROM unit 55 recognizes that the data operation unit 56 does not complete processing of transferring the FPU command "Ce" corresponding to the FPU instruction "E". Accordingly, the micro-ROM unit 55 does not perform re-writing processing of the PC queue 21 for a FPU instruction "F" which is decoded next to the FPU instruction "E", and therefore all of the PC values "b", "c", "d" and "e" for the three FPU commands "Cb", "Cc" and "Cd" being processed in the FPU and the FPU instruction "E" which are stored in the PC queue 21 are not destroyed.

When the micro-ROM unit 55 starts processing of the FPU instruction "B", and the PC value "b" stored in the PC queue 21 directly younger than the PC value "a" is destroyed, the FPU command "Cb" corresponding to the PC value "b" has already completed processing in the first FPU 11. For this reason, even when the first FPU 11 has generated an exception in executing the coprocessor instruction, the PC value of the instruction having generated that exception is held in the PC queue 21 without fail.

Also, it is assumed that the CPID of the PSW 104 of the MPU 10 is "001", and a coprocessor number "001" is given to the first FPU 11.

A system clock CLK is generated by the clock generator 14, being inputted to the MPU 10, the first FPU 11 and the memory system 13 through a signal line 70. A BAT0:1 of the signal line 71 is a signal showing the kind of bus cycle, a CPDE# of the signal line 72 is a data output control signal to the first FPU 11 being a coprocessor, a BS#, AS#, DS# and a R/W# of the signal line 73 are other bus cycle control signals outputted by the MPU 10, a CPST0:2 of the signal line 74 is a control signal transferring the internal status of the first FPU 11 to the MPU 10, a CPDC# of the signal line 75 is a bus cycle completion control signal outputted by the first FPU 11, and a DC# of the signal line 76 is a bus cycle completion control signal outputted by the memory system 13. Also, a signal line 1 is used as the data bus D0:63 and a signal line 2 is used as the address bus A0:31, respectively.

In relation to interrupt, the signal line 79 requesting an interrupt to the interrupt control circuit 15 from the memory system 13, the signal line 80 requesting an interrupt to the interrupt control circuit 15 when an exception has occurred in the first FPU 11, and a signal IRL0:2 of the signal line 78 requesting an interrupt to the MPU 10 by result of arrangement of these interrupt requests in the interrupt control circuit 15 are provided.

The signal line 3 (I0:31) is an instruction bus transferring an instruction code from the memory system 13 to the MPU 10. Each signal is operated in clock-synchronism with the system clock.

The meaning of the signal BAT0:1 of the signal line 71 is as shown on the table of FIG. 35. The contents of the address bus A0:31(2) and the data bus D0:63(1) are determined for the respective values "00", "01", "10" and "11". For the undefined (reserved) portion, the MPU 10, the first FPU 11 and the memory system 13 ignore the contents thereof.

The meaning of the signal CPST0:2 of the signal line 74 is as shown on the table of FIG. 36. A value "001" shows that the first FPU 11 is making preparatory work for data output. A value "010" shows that a command has been normally accepted. A value "011" shows that the first FPU 11 has completed data output preparation. A value "101" shows that the first FPU 11 requests re-transfer of the command. The value "110" shows that an error has taken place in transferring the command. A value "111" shows that the first FPU is not connected. Values "000" and "100" are undefined.

A signal IRL0:2 of the signal line 80 requests interrupt processing to the MPU 10 based on the value thereof. The MPU 10 determines whether an interrupt is to be accepted or to be masked according to the values of the IRL0:2 and an IMASK field in the PSW(104).

(8.1) "Memory Access Operation"

FIG. 37 is a timing chart of memory access operation of the data processing system whose configuration is shown in FIG. 34.

Memory access is performed at a rate of once per two clocks of a clock BCLK for a sufficiently-high-speed memory. FIG. 37 first shows a data read cycle of zero wait, next a data write cycle of zero wait, next an instruction read cycle of one clock wait, and next a data write cycle of one clock wait. In FIG. 37, the CLK and the BCLK are system clocks supplied through the signal line 70.

The BCLK is a bus clock having a frequency of double that of the CLK, and determines odd-number pulses and even-number pulses of the CLK. The microprocessor of the present invention operated in synchronism with the CLK is synchronized with the BCLK at reset of the system.

In the data read cycle, an address is outputted with BAT0:1 = "00" set, and the value of the data bus D0:63(1) when the DC#(76) has been asserted at a fall of the CLK during low levels of the DS# and the BCLK, and the bus cycle is completed.

In the data write cycle, BAT0:1 = "00" is set, and first, an address is outputted, and next data is outputted to the data bus D0:63(1) with one CLK clock delayed, and the DC#(76) is asserted at a fall of the CLK during low levels of the DS# and the BCLK, and thereby the bus cycle is completed.

In the instruction read cycle, an address is outputted with BAT0:1 = "01" set, and the value of the instruction bus I0:31(3) when the DC#(76) is asserted at a fall of the CLK during low levels of the DS# and the BCLK, and thereby the bus cycle is completed.

Thus, in the processor mode, input/output operation from/to the outside is performed by starting the bus cycle synchronized with the clock CLK by the microprocessor of the present invention.

(8.2) "FPU Access Operation"

Figure 38:
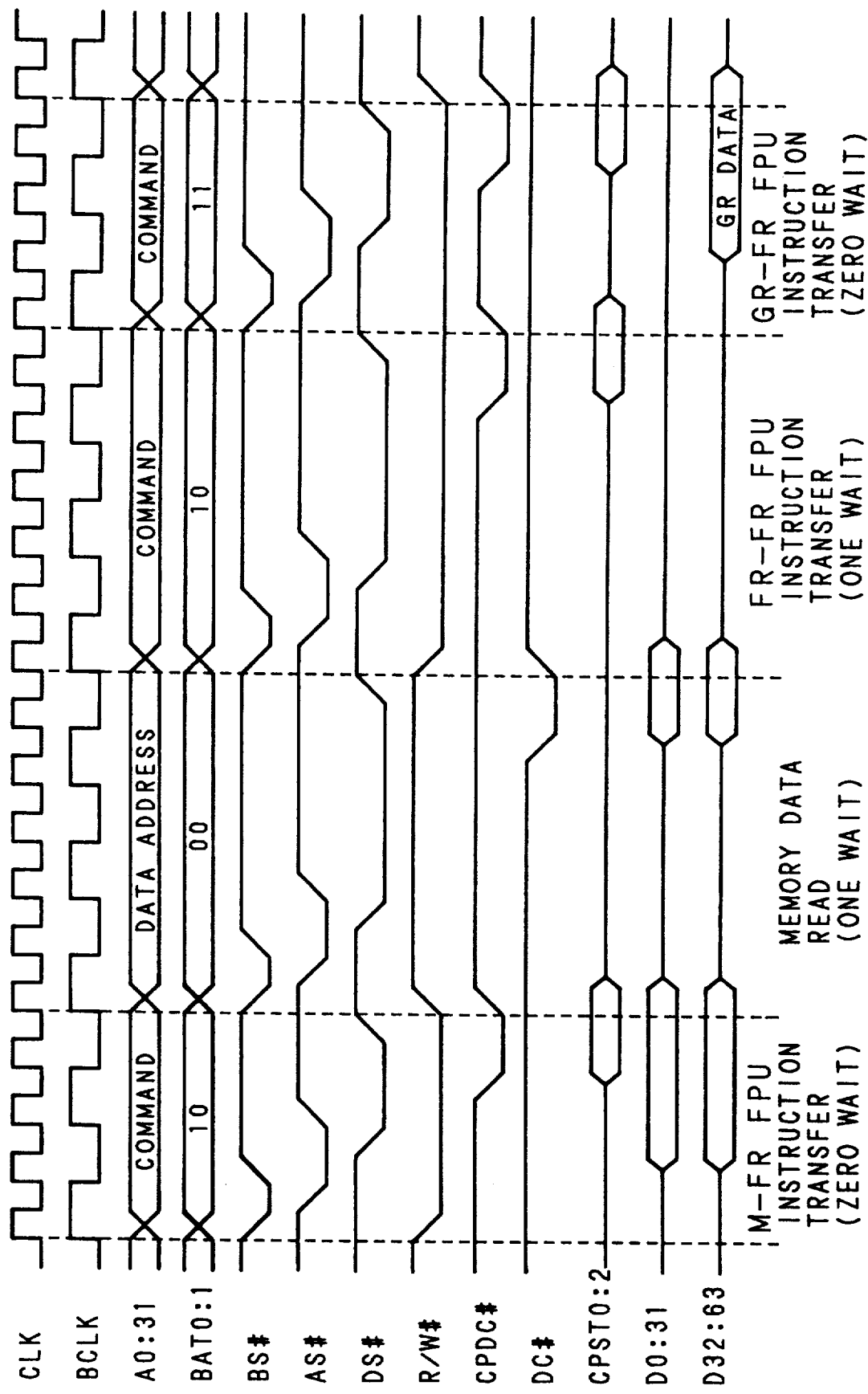
FIG. 38 is a timing chart when the microprocessor of the present invention accesses the coprocessor.

FIG. 38 shows an example of a timing chart when a command is transferred from the MPU 10 to the first FPU 11 in the data processing system whose configuration is shown in FIG. 34. A command transfer is performed as one of a kinds of bus cycle.

FIG. 38 shows first a transfer cycle of 0 wait of a command and an operand for the memory-FPU register (M-FR) FPU instruction, next a data read cycle of one wait from a memory, next a transfer cycle of one wait of a command for the FPU register-FPU register (FR-FR) FPU instruction, and next a transfer cycle of 0 wait of a command and an operand for the MPU register-FPU register (GR-FR) FPU instruction.

In the transfer cycle of a command and an operand for the memory-FPU register FPU instruction, a command is outputted from a bit 16 through a bit 31 of the address bus A0:31(2) with BAT0:1 = "10" set, and the CPDC#(75) is asserted at a fall of the CLK during low levels of the DS# and the BCLK, and thereby the MPU 10 completes the bus cycle. The first FPU 11 receives a command from the address bus 2 and receives an operand from the data bus D0:63(1), respectively. At this time, the status of the first FPU 11 is informed to the MPU 10 by the value of the CPST0:2(74).

The transfer cycle of a command for the FPU register-FPU register FPU instruction is the same as the transfer cycle of a command and an operand for the memory-FPU register FPU instruction except that the operand transfer does not exist.

The transfer cycle of a command and an operand for the MPU register-FPU register FPU instruction is also similar to the transfer cycle of a command and an operand for the memory-FPU register FPU instruction. This means that this differs in that the operand is transferred only by four low-order bytes of the data bus 1.

Figure 39:
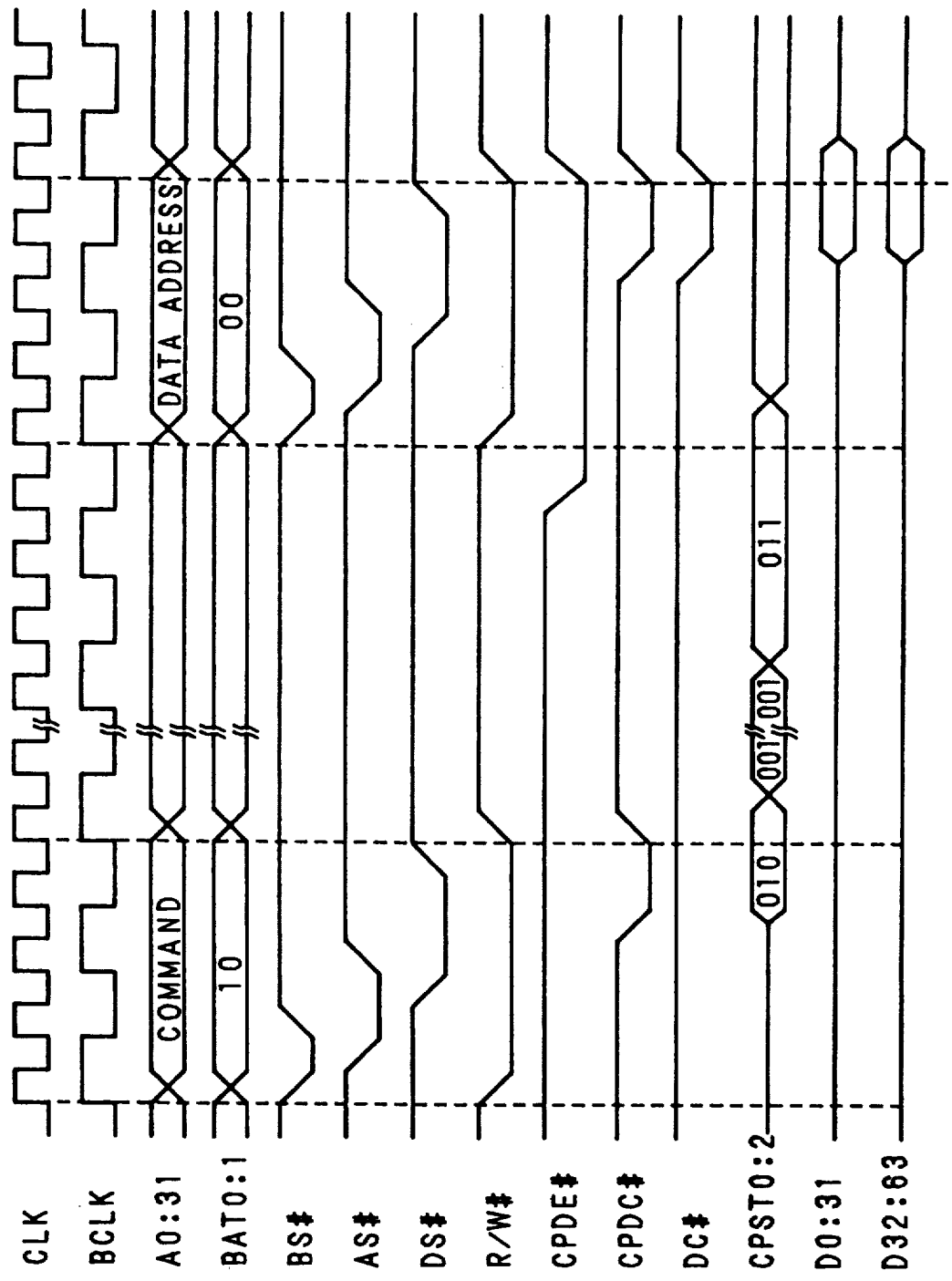
FIG. 39 is a timing chart of memory cycle when an FPU register-memory FPU instruction is executed in the microprocessor of the present invention.

FIG. 39 is a timing chart when transfers of a command and an operand for the FPU register-memory FPU instruction are performed in the data processing system whose configuration is shown in FIG. 3. In this case, first a command is transferred from the MPU 10 to the first FPU 11, and thereafter an operand is transferred from the first FPU 11 to the MPU 10 and the memory system 13.

In the transfer cycle of a command, a command is outputted from a bit 10 through a bit 31 of the address bus A0:31(3) with BAT0:1 = "10" set, and the CPDC#(75) is asserted at a fall of the CLK during low levels of the DS# and the BCLK, and thereby the MPU 10 completes the bus cycle. The first FPU 11 receives a command from the address bus 2. At this time, the status of the first FPU 11 is informed to the MPU 10 by the value of the CPST0:2(74). In this example, the command is for the FPU register-memory FPU instruction, so that the first FPU 11 normally receives the command, and the CPST0:2(74) sequentially changes to "010"→"001"→"011". After transferring the command, the MPU 10 checks the value of this CPST0:2, asserts the CPDE# after it has changed to "011", and starts a bus cycle of operand transfer one clock after that.

In this cycle, a memory address whereto the operand is to be stored is outputted from the MPU 10 to the address bus A0:31(2) with BAT0:1 = "00" set, and the operand is outputted from the first FPU 11 to the data bus D0:63(1). The operand is fetched by both of the MPU 10 and the memory system 13. The reason why the MPU 10 fetched the operand is to rewrite a built-in data cache.

Also, the protocol and timing in the case where the MPU 10 accesses the second FPU 12 are basically the same as the case where the MPU 10 accesses the first FPU 11. The only difference therefrom is that the memory cycle transferring the PC value of the coprocessor from the MPU 10 to the second FPU 12 with BAT0:1="11" set exists immediately after the memory cycle having transferred the command.

(9) "Processing Examples of Coprocessing Instruction"

Figure 40A:
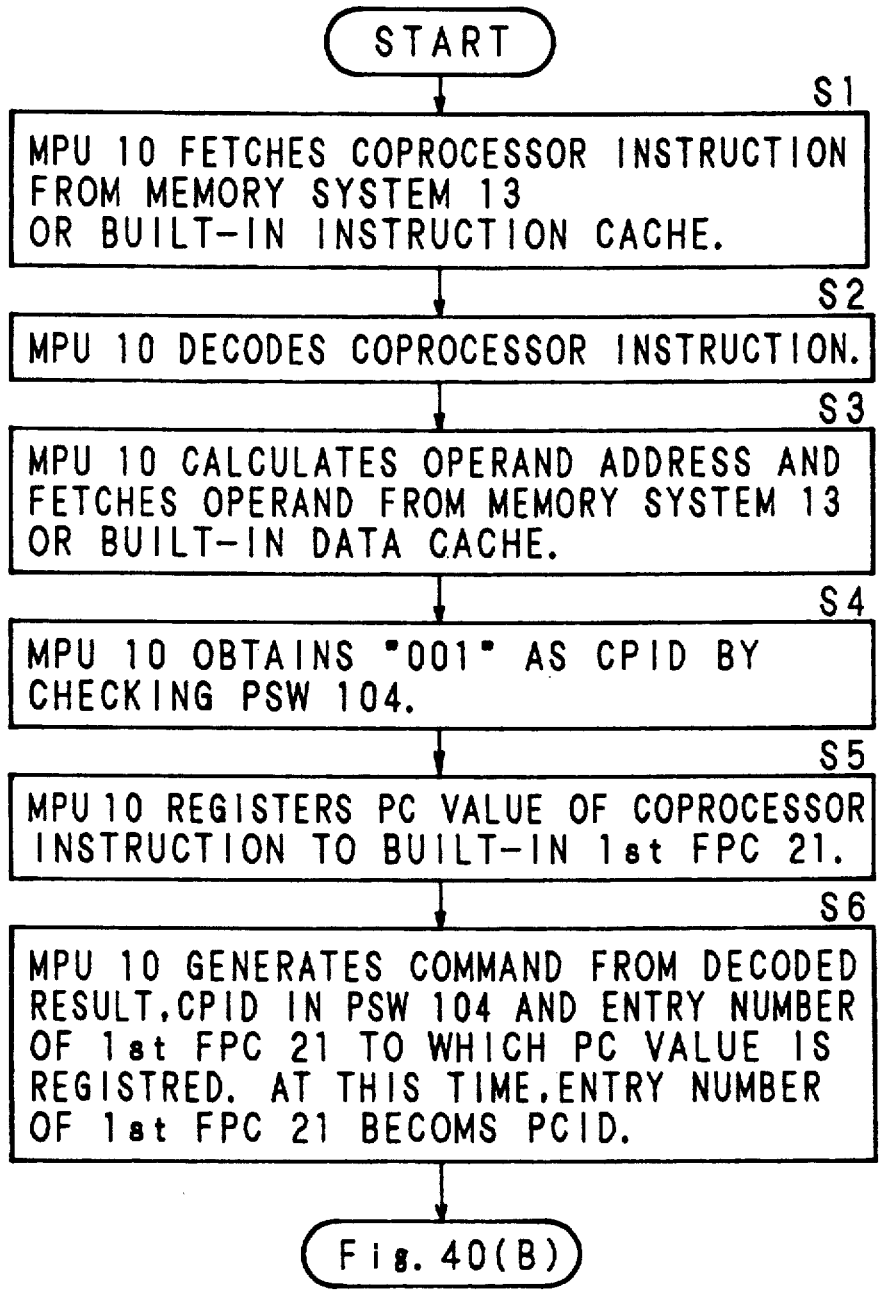
FIG. 40 through FIG. 43 are flow charts when various coprocessor instructions are executed in the data processing system using the microprocessor and the coprocessors of the present invention.
Figure 40B:
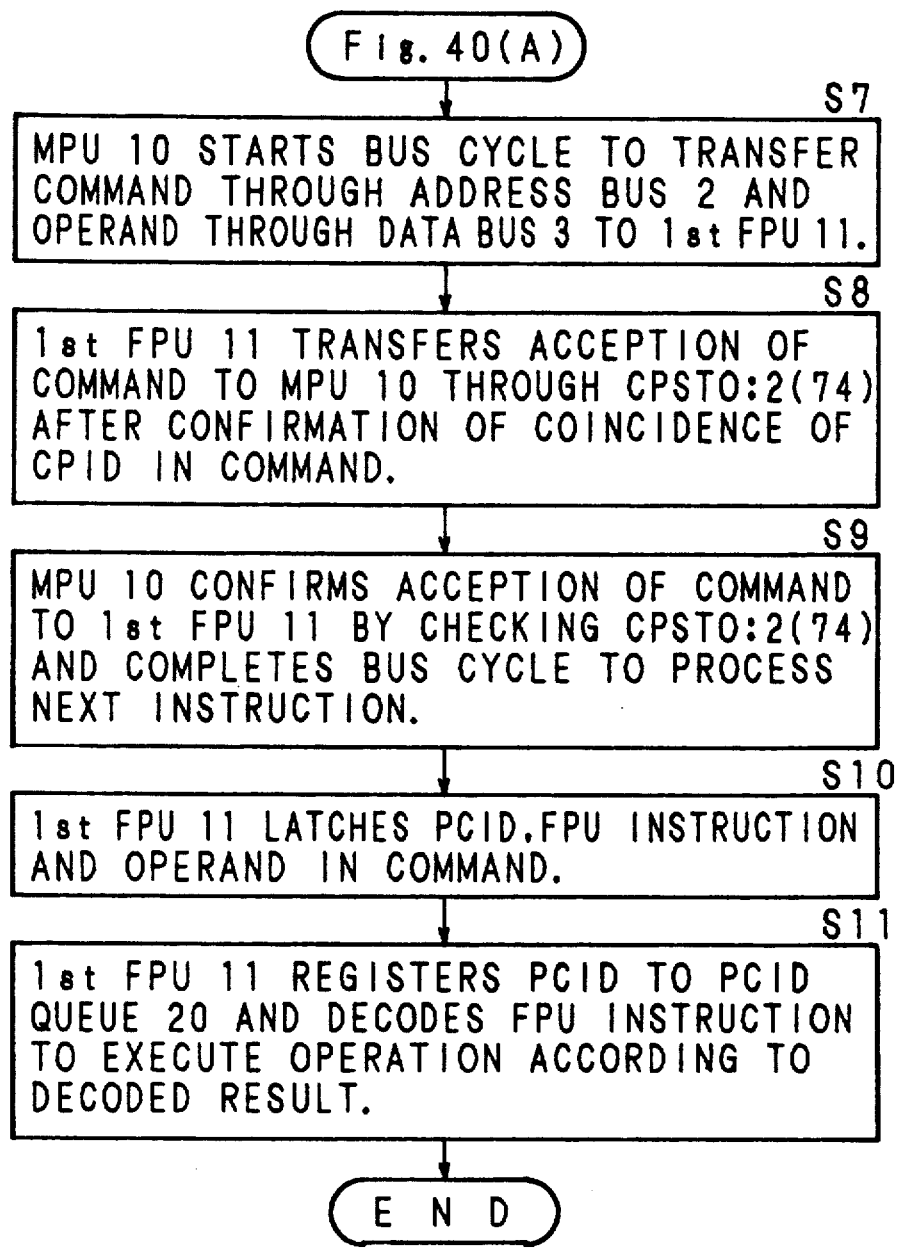
Figure 41B:
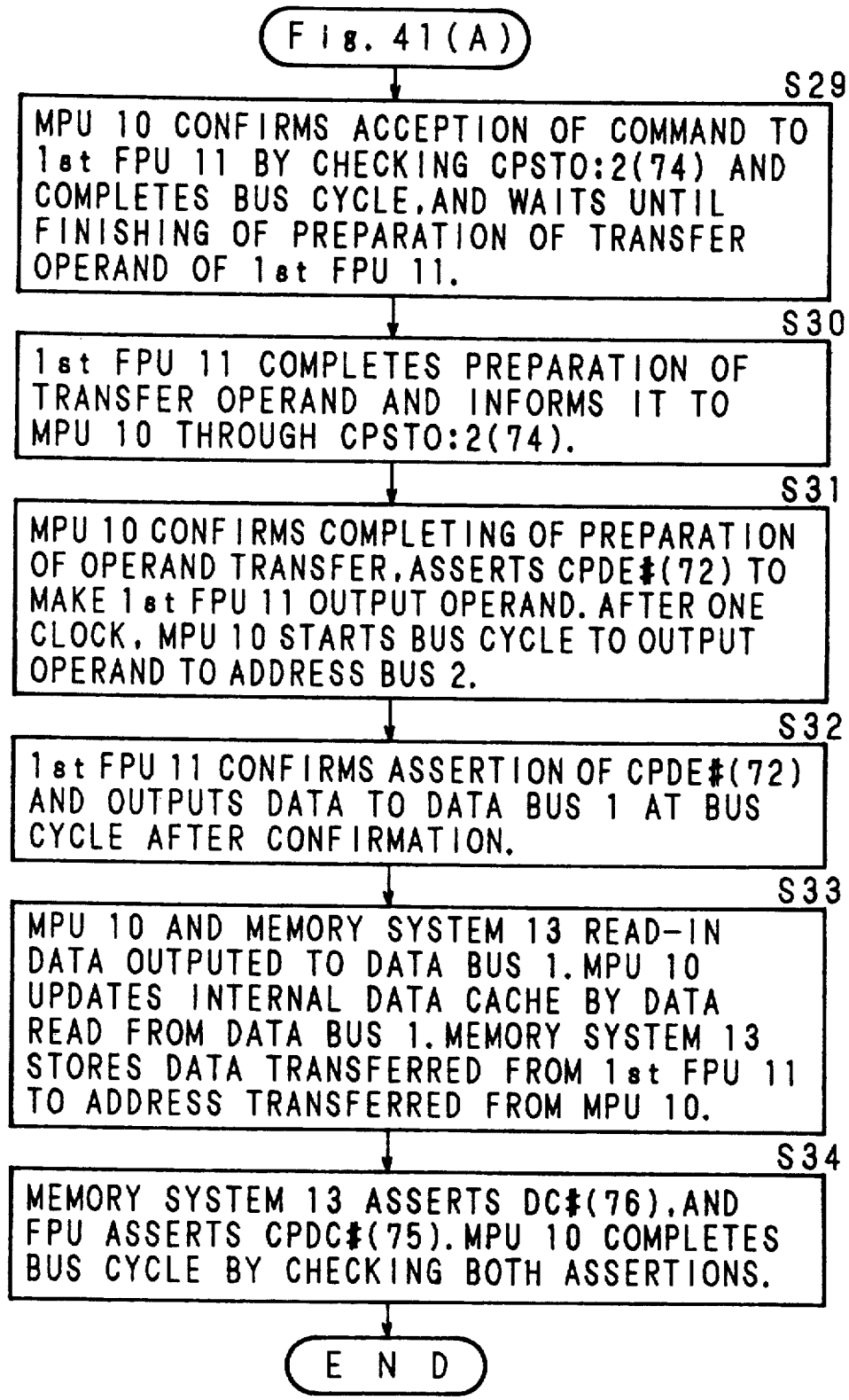
Figure 42A:
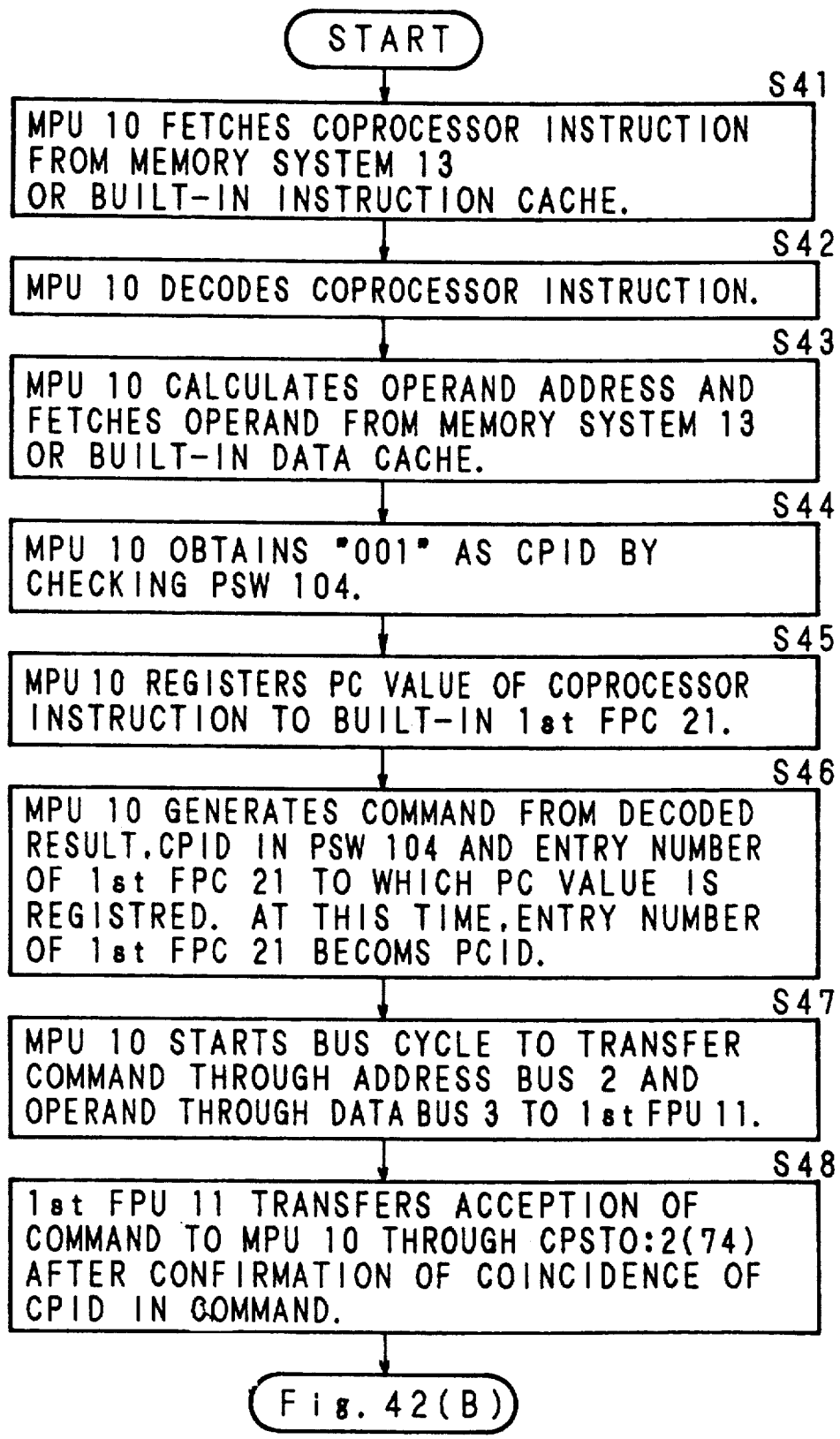

FIG. 40 through FIG. 42 are flow charts of processing sequence examples when a coprocessor instruction is executed in the first FPU 11.

The CPID of the first FPU 11 is "001", and in these example, the CPID value in the PSW 104 of the MPU 10 is also "001", and therefore the PC value of the coprocessor instruction is not transferred to the first FPU 11.

FIG. 40 is a flowchart of processing sequence from a fetch of a coprocessor instruction which is the memory-FPU register FPU instruction by the MPU 10 to an execute thereof in the first FPU 11.

First, the MPU 10 fetches a coprocessor instruction from the memory system 13 or the built-in cache (Step S1), and decodes it (Step S2).

Subsequently, the MPU 10 calculates an operand address, fetches an operand from the memory system 13 or the built-in cache (Step S3), checks the value of the PSW 104, and obtains CPID="001" (Step S4).

Next, the MPU 10 registers the PC value of the coprocessor instruction to a built-in first FPC 21 (Step S5).

The MPU 10 generates a command from the decoded result of the coprocessor instruction, the CPID in teh PSW 104 and the entry number of the first FPC 21 whereto the PC value has been registered, and makes the entry number of the first FPC 21 be the PCID (Step S6).

The MPU 10 starts a bus cycle, and transfers the command to the first FPU 11 through the address bus 2, and transfers the operand to the first FPU 11 through the data bus 3, respectively (Step S7).

The first FPU 11 confirms a match of the CPID in the command, and informs a reception of the command to the MPU 10 through the CPST0:2(74) (Step S8).

The MPU 10 confirms that the command has been accepted by the first FPU 11 by a signal of the CPST0:2(74), and completes the bus cycle, and turns to processing of the next instruction (Step S9).

The first FPU 11 latches the PCID in the command, the FPU instruction and the operand (Step S10).

Subsequently, the first FPU 11 registers the PCID to the PCID queue 20, decodes the FPU instruction, and executes operation according to the decoded result (Step S11).

FIG. 41 is a flow chart of processing sequence from a fetch by the MPU 10 to an execute by the first FPU 11 of a coprocessor instruction being the FPU register-memory FPU instruction.

First, the MPU 10 fetches a coprocessor instruction from the memory system 13 or the built-in cache (Step S21), and decodes it (Step S22).

Subsequently, the MPU 10 calculates an operand address (Step S23), checks the value of the PSW 104, and obtains CPID="001" (Step S24).

The MPU 10 generates a command from the decoded result of the coprocessor instruction and the CPID in the PSW 104 (Step S25). Subsequently, the MPU 10 starts a bus cycle, and transfers the command to the first FPU 11 through the address bus 2 (Step S26).

The first FPU 11 confirms a match of the CPID in the command, and then transfers a reception of the command to the MPU 10 through the CPST0:2(74) (Step S27).

The first FPU 11 registers the PCID to the PCID queue 20, and decodes the FPU instruction, and according to the decoded result thereof, performs preparatory work for transferring the content of the FPU instruction register. During the preparatory work, the first FPU 11 informs the MPU 10 through the CPST0:2(74) of that it is preparing for a transfer (Step S28).

The MPU 10 confirms the reception of the command by the first FPU 11 by a signal of the CPST0:2(74), and completes the bus cycle, and successively by the signal of the CPST0:2 (74), waits until the first FPU 11 completes preparation for transferring the operand (Step S29).

The first FPU 11 completes preparation for transferring the operand, and informs the MPU 10 through the CPST0:2(74) of that the preparation for transferring the operand has completed (Step S30).

The MPU 10 knows the competition of preparation for transferring the operand by a signal of the CPST0:2(74), and asserts the CPDE#(72) to make the first FPU 11 output the operand, and starts a bus cycle one clock after that, out-putting an operand address to the address bus 2 (Step S31).

The first FPU 11 confirms that the CPDE#(72) has been asserted, and outputs data to the data bus 1 in the subsequent bus cycle (Step S32).

The MPU 10 and the memory system 13 read the data outputted to the data bus 1. The MPU 10 renews the internal data cache with the read value. The memory system 13 stores the data transferred from the first FPU 11 at the address transferred from the MPU 10 (Step S33).

The memory system 13 asserts the DC#(76), and the FPU asserts the CPDC#(75), and the MPU 10 completes the bus cycle based thereon (Step S34).

FIG. 42 is a flow chart of processing sequence in the case where a coprocessor instruction being the memory-FPU register FPU instruction is fetched by the MPU 10, and is executed by the first FPU 11 and causes an exception, and the first FPU 11 requests an interrupt to the MPU 10 through the interrupt control circuit 15, and the MPU 10 performs exception processing.

Exception processing is processed by the interrupt processing handler. In the microprocessor of the present invention, an instruction reading the PCID from the first FPU 11 and a privileged instruction reading the PC value of a coprocessor instruction from the corresponding entry of the PC queue 21 of the MPU 10 based on PCID are provided. The interrupt processing handler reads the PCID and the PC value of the coprocessor using these instructions.

Processings from Step S41 to Step S50 are the same as the processings from Step S1 to Step S10 in FIG. 40, respectively.

In Step S51, the first FPU 11 registers the PCID to the PCID queue 20, decodes the FPU instruction, performs operation according to the decoded result, and detects the exception.

The first FPU 11 transfers the PCID corresponding to the FPU instruction having generated the exception to the PCID for output of the PCID queue 20, and asserts the interrupt request signal 80 (Step S52).

The interrupt processing control circuit 15 requests interrupt processing to the MPU 10 through the interrupt request signal IPL0:2(78) (Step S53).

The MPU 10 starts the interrupt processing handler (Step S54).

The interrupt processing handler takes out exception information from the first FPU 11 and the PCID for output in the PCID queue 20, and takes out the PC value of the coprocessor instruction having generated the exception from the MPU 10 (Step S55).

Figure 43A:
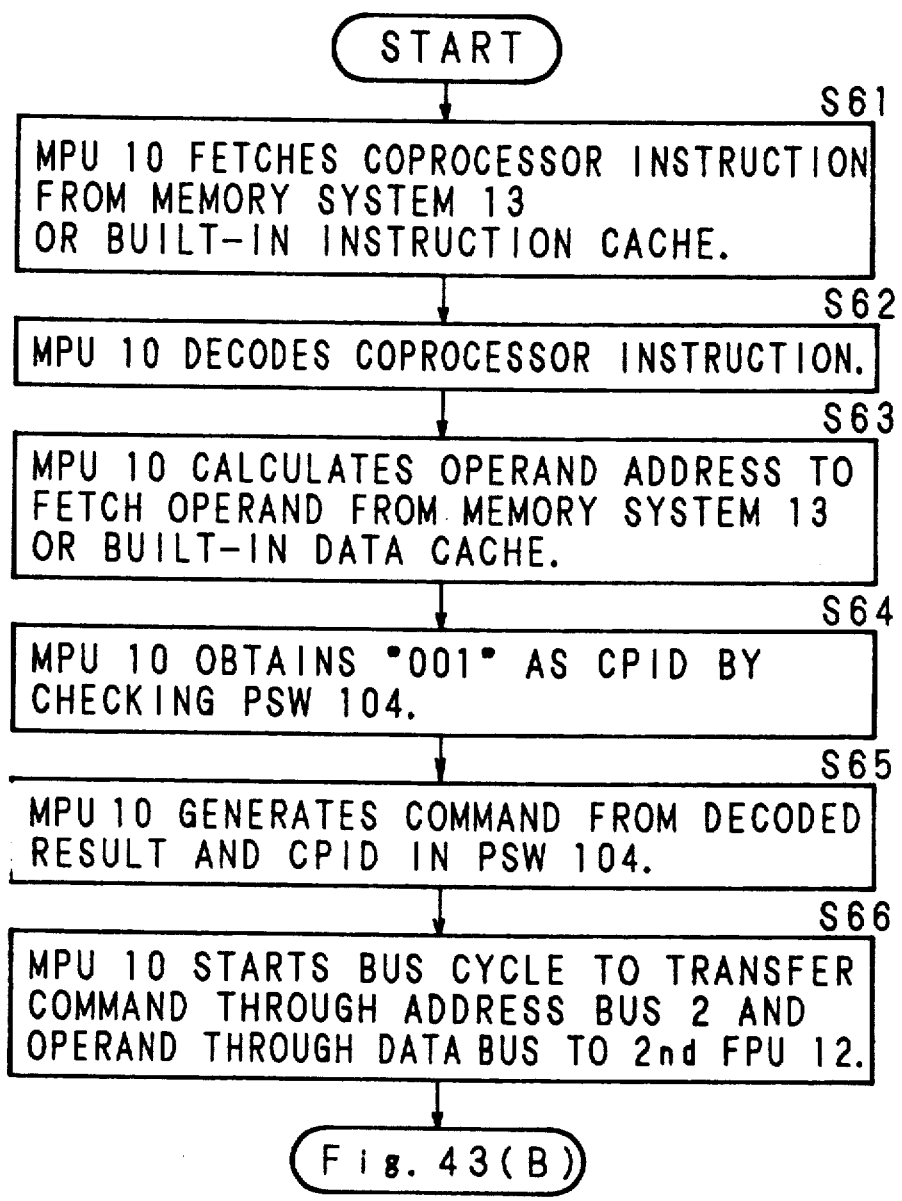
Figure 43B:
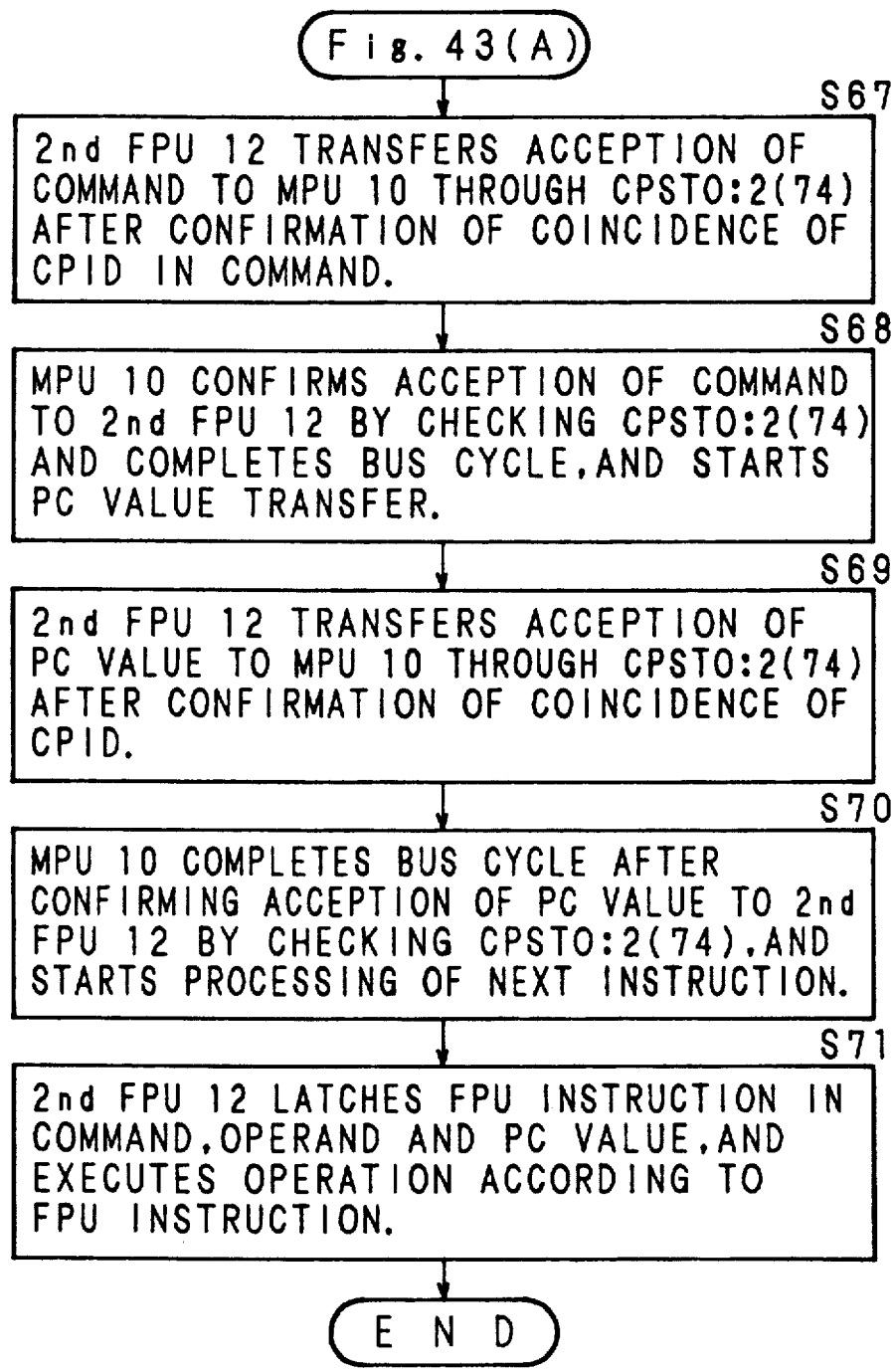

FIG. 43 is a flow chart of processing sequence from a fetch by the MPU 10 to an execute by the second FPU 12 of a coprocessor instruction being a memory-FPU register FPU instruction.

The CPID of the second FPU 12 is "010", and here a case is shown where a coprocessor instruction is executed when the CPID value in the PSW 104 of the MPU 10 is "010".

First, the MPU 10 fetches a coprocessor instruction from the memory system 13 or the built-in cache (Step S61), and decodes it (Step S62).

Subsequently, the MPU 10 calculates an operand address, fetches an operand from the memory system 13 or the built-in cache (Step S63), checks the value of the PSW 104, and obtains CPID="010" (Step S64).

The MPU 10 generates a command from the decoded result of the coprocessor instruction and the CPID in the PSW 104 (Step S65). Subsequently, the MPU 10 starts a bus cycle, and transfers the command to the second FPU 12 through the address bus 2 (Step S66).

The second FPU 12 confirms a match of the CPID in the command, and then transfers the reception of the command to the MPU 10 through the CPST0:2(74) (Step S67).

The MPU 10 confirms the reception of the command by the second FPU 12 by a signal of the CPST0:2(74), and completes the bus cycle, turning to processing of transferring the PC value (Step S68).

The second FPU 12 confirms a match of the CPID, and transfers the reception of the PC value to the MPU 10 through the CPST0:2(74) (Step S69).

The MPU 10 confirms the reception of the PC value by the second FPU 12 by a signal of the CPST0:2(74), and completes the bus cycle, turning to processing of the next instruction (Step S70).

The second FPU 12 latches the FPU instruction, the operand and the PC value in the command, and executes operation according to the FPU instruction (Step S71).

(10) "Another Embodiment of the Present Invention"

In the above-described embodiment, command transfer and operand transfer from the MPU 10 to the coprocessor are performed on the same memory cycle, but are not always required to be performed on one memory cycle. Where the number of bits of an operand is larger than the number of bits of the data bus 1, the operand transfer may be performed on a plurality of memory cycles.

Also, in the present invention, an exception in executing a coprocessor is processed by an interrupt, and operation reading the PCID from the first FPU 11 and operation reading the PC value of the coprocessor instruction stored in the entry of the PC queue 21 from the MPU 10 are performed by instructions in the handler. However, it is also possible that an exception generated in executing a coprocessor instruction is informed to the MPU 10 by a dedicated signal, and the MPU 10 performs a read of the PCID and a read of the content of the entry of the PC queue 21 as hardware operation, and the PC value of the coprocessor instruction having caused the exception is stacked in the stack as information to be delivered to the exception processing handler. In this case, the exception processing handler obtains the PC value of the coprocessor instruction having caused the exception from the stack, and therefore the handler is not required to read the PCID or read the content of the PC queue 21.

Also, in the above-mentioned embodiment, in executing a coprocessor instruction, whether a command is to be transferred to the first FPU 11 or the command is to be transferred to the second FPU 12 is directed by the CPID. In the case where the command is transferred to the first FPU 11 with CPID="001" set, the PC value of the coprocessor instruction is held in the PCID queue 20, but operation of holding the PC value by this PCID queue 20 is not always required. The PC value of the coprocessor instruction is necessary for identifying the coprocessor instruction when the coprocessor instruction has generated an exception, and is not necessary basically for executing that coprocessor instruction. Accordingly, it is also possible that even if the PCID queue 20 of the MPU 10 holding the PC value of the coprocessor is not provided, when the address of the coprocessor instruction is required to be identified for the exception generated in executing the coprocessor instruction, the coprocessor instruction is executed by the second FPU 12 with CPID="010" set, and where the address of the coprocessor instruction is not required to be identified for the exception of the coprocessor instruction, the coprocessor instruction is executed by the first FPU 11 with CPID="001" set.

As detailed above, in the microprocessor, the coprocessors and the data processing system using them in accordance with the present invention, the program counter value holding means (PC queue) holding the PC values of the coprocessor instructions is installed to provide for a generation of exception in executing the coprocessor instruction, and therefore in transferring the command corresponding to the coprocessor instruction, no memory cycle is needed to transfer the PC value of the coprocessor instruction. Accordingly, operational direction to the coprocessor for the coprocessor instruction can be made on one memory cycle, and thereby a high-performance data processing system becomes obtainable.

Also, the program counter value holding means (PC queue) is provided with a plurality of entries, and the entry numbers thereof are transferred to the coprocessor while connected to the command, and therefore it is possible to transfer a plurality of command in a queued fashion while discriminating the PC value of the corresponding program counter value holding means for the coprocessor. The entry number consists of two bits, which is a very small bit number in comparison with 32 bits of the PC value of the coprocessor instruction, and even if the command and the entry number are connected, the whole can be transferred by one bus cycle through the address bus 2 of 32 bits. For this reason, operational direction to the coprocessor for the coprocessor instruction can be made on one memory cycle, and therefore a high-performance data processing system can be constituted using the microprocessor of the present invention.

Also, whether or not the PC value of the coprocessor instruction is to be transferred is discriminated from the value of the coprocessor identifier (CPID), and therefore even where a plurality of coprocessors are connected to the microprocessor, and a plurality of coprocessors are simultaneously operated in parallel while the coprocessor identifier is changed, the PC value of the coprocessor instruction can be held by one program counter value holding mechanism for one specific coprocessor. Accordingly, a data processing system connecting a plurality of coprocessors can be constituted without spoiling the effect of the program counter value holding means.

Also, a means for judging whether or not the PC value of the main processor instruction is to be transferred to the coprocessor from the value of the coprocessor identifier (CPID) is an effective means irrespective of the program counter holding means (PC queue). By this function, the coprocessor can be used properly in a manner that the case necessitating identifying the PC value of the coprocessor instruction and the case not necessitating it are distinguished from each other by the value of the CPID when an exception has occurred in the coprocessor. This means that in the microprocessor, the coprocessors and the data processing system using them in accordance with the present invention, the coprocessor attaching importance to the performance by performing operational direction on a small number of cycles without transferring the PC value of the coprocessor instruction and the coprocessor attaching importance to identifying the corresponding coprocessor instruction when an exception has occured by transferring the PC value of the coprocessor instruction can be properly used, respectively.

As this invention may be embodied in several forms without departing rom the spirit of essential characteristics thereof, the present embodiment is therefore illustrative and not restrictive, since the scope of the invention is defined by the appended claims rather than by the description preceding them, and all changes that fall within the meets and bounds of the claimed, or equivalence of such meets and bounds thereof are therefore intended to be embraces by the claims.

What is claimed is:

1. A processor system comprising:
    a coprocessor for executing a coprocessor instruction;
    a main processor, coupled to said coprocessor, and having:
    (i) a decoder for decoding fetched instructions, including a main processor instruction and a coprocessor instruction, and outputting a given coprocessor command to said coprocessor;
    (ii) a main processor program counter for holding a PC value of said main processor instruction;
    (iii) wherein said main processor commences execution of a plurality of main processor instructions during execution of said given coprocessor command by said coprocessor; and
    (iv) a program counter for holding a program counter value of said coprocessor instruction at least until said coprocessor has finished executing said given coprocessor command.

2. A processor system comprising:
    a coprocessor for executing a coprocessor instruction;
    a main processor, coupled to said coprocessor, and having:
    (i) a decoder for decoding fetched instructions, including a main processor instruction and a coprocessor instruction, and outputting a given coprocessor command to said coprocessor;
    (ii) a main processor program counter for holding a PC value of said main processor instruction;
    (iii) wherein said main processor commences execution of a plurality of main processor instructions during execution of said given coprocessor command by said coprocessor;
    (iv) a program counter for holding a program counter value of said coprocessor instruction at least until said coprocessor has finished executing said given coprocessor command; and
    means, coupled to said coprocessor and to said program counter for asserting in invalid operation signal when execution of said given coprocessor instruction causes an exception and for reading said program counter value of said coprocessor instruction from said program counter.

3. The processor system of claim 2 wherein an exception comprises one of a floating point underflow condition and a floating point overflow condition.

4. A processor system comprising:
    a coprocessor for executing instructions wherein said coprocessor comprises a first and a second coprocessor unit;
    a main processor, coupled to said coprocessor, and having:
    (i) a decoder for decoding fetched instructions, including a main processor instruction and a coprocessor instruction, and outputting a given coprocessor command to said coprocessor;
    (ii) a main processor program counter for holding a PC value of said main processor instruction;
    (iii) wherein said main processor commences execution of a plurality of main processor instructions during execution of said given coprocessor command by said coprocessor; and
    (iv) a program counter for holding a program counter value of said coprocessor instruction at least until said coprocessor has finished executing said given coprocessor command;
    a register for storing a CPID information specifying one of said first and second coprocessing units; and
    means for transferring said CPID information to said first coprocessing unit concurrently with the transfer of said given coprocessor command when the CPID information specifies said first coprocessing unit and for transferring the program counter value of said given instruction to said second coprocessing unit when the CPID information specifies said second coprocessing unit.

5. A processor system comprising:
    a coprocessor for executing a coprocessor instruction;
    a decoder for decoding fetched instructions, including a main processor instruction and a coprocessor instruction, and outputting a given coprocessor command to said coprocessor;
    a main processor, coupled to said coprocessor and wherein said main processor commences execution of a plurality of main processor instructions during execution of said given coprocessor instruction by said coprocessor;

a main program counter for holding a PC value of said main processor instruction; and a program counter within said main processor, for holding a program counter value of said coprocessor instruction at least until said coprocessor has finished executing said given coprocessor command.

6. A processor system comprising:

a coprocessor for executing a coprocessor instruction;

a decoder for decoding fetched instructions, including a main processor instruction and a coprocessor instruction, and outputting a given coprocessor command to said coprocessor;

a main processor, coupled to said coprocessor and wherein said main processor commences execution of a plurality of main processor instructions during execution of said given coprocessor instruction by said coprocessor;

a main program counter for holding a PC value of said main processor instruction;

a program counter within said main processor, for holding a program counter value of said coprocessor instruction at least until said coprocessor has finished executing said given coprocessor command; and means, coupled to said coprocessor and to said program counter for asserting an invalid operation signal when execution of said given coprocessor instruction causes an exception and for reading said program counter value of said coprocessor instruction from said program counter.

7. The processor system of claim 6 wherein an exception comprises one of a floating point underflow condition and a floating point overflow condition.

8. A processor system wherein said coprocessor comprises a first and a second coprocessor and wherein the processor system comprises:

a coprocessor for executing a coprocessor instruction;

a decoder for decoding fetched instructions, including a main processor instruction and a coprocessor instruction, and outputting a given coprocessor command to said coprocessor;

a main processor, coupled to said coprocessor and wherein said main processor commences execution of a plurality of main processor instructions during execution of said given coprocessor instruction by said coprocessor;

a main program counter for holding a PC value of said main processor instruction;

a program counter within said main processor, for holding a program counter value of said coprocessor instruction at least until said coprocessor has finished executing said given coprocessor command;

a register for storing a CPID information specifying one of said first and second coprocessing units; and means for transferring said CPID information to said first coprocessing unit concurrently with the transfer of said given coprocessor command when the CPID information specifies said first coprocessing unit and for transferring the program counter value of said given instruction to said second coprocessing unit when the CPID information specifies said second coprocessing unit.

9. A processing system comprising:

a first coprocessor for executing a first coprocessor instruction;

a second coprocessor for executing a second coprocessor instruction;

a main processor, coupled to said first and said second coprocessors, and having:

(i) a decoder for decoding fetched instructions, including a main processor instruction and said first and said second coprocessor instructions and outputting a given coprocessor command to one of said first and said second said coprocessors;

(ii) a program counter for holding a PC value of said main processor instruction;

(iii) wherein said main processor commences execution of a plurality of main processor instructions during execution of said given coprocessor command; and (iv) a first coprocessor program counter located within said main processor, for holding a program counter value of said first coprocessor instruction at least until said coprocessor has finished executing a first given coprocessor command;

a second coprocessor program counter within said second coprocessor for holding a program counter value of said second coprocessor instruction at least until said second coprocessor has finished executing a second given coprocessor command; and means, coupled to said first coprocessor, for transferring, concurrently with the transfer of said given coprocessor command, a PCID information to said first coprocessor specifying whether the program counter value for said given coprocessor instruction is held in said first or said second coprocessor program counter.

10. A processing system comprising:

a coprocessor for executing a coprocessor instruction;

a main processor, coupled to said coprocessor, and having:

(i) a decoder for decoding fetched instructions, including a main processor instruction and a coprocessor instruction and outputting a given coprocessor command to said coprocessor;

(ii) a program counter for holding a PC value of said main processor instruction;

(iii) wherein said main processor commences execution of a plurality of main processor instructions during execution of said given coprocessor command;

a first coprocessor program counter located within said main processor, for holding a program counter value of a first coprocessor instruction at least until said coprocessor has finished executing a first given coprocessor command;

a second coprocessor program counter coupled to said first coprocessor program counter via a bus for holding a program counter value of a second coprocessor instruction at least until said coprocessor has finished executing a second given coprocessor command;

means, coupled to said coprocessor, for transferring, concurrently with the transfer of a given coprocessor command, a PCID information to said coprocessor specifying whether the program counter value for a given coprocessor instruction is held in said first or said second coprocessor program counter; and means, coupled to said coprocessor and to said first and said second coprocessor program counters, for asserting an invalid operation signal when execution of said given coprocessor instruction causes an exception and for reading said program counter value of said coprocessor instruction from one of said first and said second coprocessor program counters according to the PCID information.

11. The processor system of claim 10 wherein an exception comprises one of a floating point underflow condition and a floating point overflow condition.

12. A processor system comprising:

a first coprocessor for executing a first coprocessor instruction;

a second coprocessor for executing a second coprocessor instruction;

a decoder for decoding fetched instruction, including a main processor instruction and said first and said second coprocessor instructions, and outputting a given coprocessor command to one of said first and said second coprocessors;

a main processor, coupled to said first and said second coprocessors and wherein said main processor commences execution of a plurality of main processor instructions during execution of said given coprocessor command;

a program counter for holding a PC value of said main processor instruction;

said first coprocessor program counter located within said main processor, for holding a program counter value of a first coprocessor instruction at least until said coprocessor has finished exectuing a first given coprocessor command;

said second coprocessor program counter located within said second coprocessor for holding a program counter value of a second coprocessor instruction at least until said coprocessor has finished executing a second given coprocessor command; and means, coupled to said first coprocessor, for transferring, concurrently with the transfer of said given coprocessor command, a PCID information to said first coprocessor specifying whether the PC value for said given coprocessor instruction is held in said first or said second coprocessor program counters.

13. A processor system comprising:

a coprocessor for executing a coprocessor instruction;

a decoder for decoding fetched instruction, including a main processor instruction and a coprocessor instruction, and outputting a given coprocessor command to said coprocessor;

a main processor, coupled to said coprocessor and wherein said main processor commences execution of a plurality of main processor instructions during execution of said given coprocessor command;

a program counter for holding a PC value of said main processor instruction;

a first coprocessor program counter located within said main processor, for holding a program counter value of a first coprocessor instruction at least until said coprocessor has finished executing a first given coprocessor command;

a second coprocessor program counter coupled to said first coprocessor program counter via a bus for holding a program counter value of a second coprocessor instruction at least until said coprocessor has finished executing a second given coprocessor command; and means, coupled to said coprocessor, for transferring, concurrently with the transfer of said given coprocessor command, a PCID information to said coprocessor specifying whether the PC value for a given coprocessor instruction is held in said first or said second coprocessor program counters; and means, coupled to said coprocessor and to said first and said second coprocessor program counters, for asserting an invalid operation signal when execution of said given coprocessor instruction causes an exception and for reading said program counter value of said coprocessor instruction from one of said first and said second coprocessor program counters according to the PCID information.

* * * * *

UNITED STATES PATENT AND TRADEMARK OFFICE
CERTIFICATE OF CORRECTION

PATENT NO. : 5,218,711
DATED : June 8, 1993
INVENTOR(S) : Tokohiko Toshida

It is certified that error appears in the above-identified patent and that said Letters Patent is hereby corrected as shown below:

Column 1, line 10

"a small number of us" should read --a small number of bus--

Column 1, line 15

"main processor instruction" should read --coprocessor instruction--

Signed and Sealed this

Nineteenth Day of July, 1994

Attest:

BRUCE LEHMAN

Attesting Officer    Commissioner of Patents and Trademarks